United States Patent
Baghel et al.

(10) Patent No.: US 11,889,495 B2
(45) Date of Patent: Jan. 30, 2024

(54) SHARED INFORMATION FOR INTER-USER EQUIPMENT COORDINATION ON A SIDELINK CHANNEL

(71) Applicant: QUALCOMM Incorporated, San Diego, CA (US)

(72) Inventors: Sudhir Kumar Baghel, Hillsborough, NJ (US); Gabi Sarkis, San Diego, CA (US); Kapil Gulati, Belle Mead, NJ (US); Sourjya Dutta, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 17/224,920

(22) Filed: Apr. 7, 2021

(65) Prior Publication Data

US 2021/0321430 A1    Oct. 14, 2021

Related U.S. Application Data

(60) Provisional application No. 63/008,587, filed on Apr. 10, 2020.

(51) Int. Cl.
*H04W 72/00* (2023.01)
*H04W 72/1263* (2023.01)
*H04W 72/0453* (2023.01)
*H04W 72/02* (2009.01)
*H04W 72/0446* (2023.01)
*H04W 72/50* (2023.01)
*H04W 72/566* (2023.01)

(52) U.S. Cl.
CPC ....... *H04W 72/1263* (2013.01); *H04W 72/02* (2013.01); *H04W 72/0446* (2013.01); *H04W 72/0453* (2013.01); *H04W 72/535* (2023.01); *H04W 72/569* (2023.01)

(58) Field of Classification Search
None
See application file for complete search history.

(56) References Cited

U.S. PATENT DOCUMENTS

| | | | |
|---|---|---|---|
| 2018/0234889 A1* | 8/2018 | Baghel | H04W 72/563 |
| 2018/0255563 A1* | 9/2018 | Chen | H04W 4/70 |
| 2019/0053194 A1* | 2/2019 | Wei | H04W 72/20 |
| 2020/0236656 A1* | 7/2020 | Cao | H04W 80/02 |
| 2021/0120528 A1* | 4/2021 | Peng | H04W 4/44 |
| 2022/0015071 A1* | 1/2022 | Hui | H04W 72/56 |
| 2022/0377749 A1* | 11/2022 | Lee | H04W 28/26 |
| 2023/0006778 A1* | 1/2023 | Ryu | H04L 1/1861 |

* cited by examiner

Primary Examiner — Abdelillah Elmejjarmi
(74) Attorney, Agent, or Firm — Holland & Hart LLP

(57) ABSTRACT

Methods, systems, and devices for wireless communications are described. A device (such as a first user equipment (UE)) may communicate control signaling indicating a resource allocation for a sidelink channel. The first UE may receive, from a second UE, a first resource map. The first resource map may indicate a first sidelink transmission scheduled within a first time and frequency resource of the resource allocation, a first priority level of the first resource map, and a parameter threshold used to generate the first resource map. In some cases, the first UE may communicate a second sidelink transmission within the resource allocation for the sidelink channel based on the first resource map.

30 Claims, 12 Drawing Sheets

— First time and frequency resource 305

— Second time and frequency resource 310

SHARED INFORMATION FOR INTER-USER EQUIPMENT COORDINATION ON A SIDELINK CHANNEL

CROSS REFERENCE

The present application for patent claims the benefit of U.S. Provisional Patent Application No. 63/008,587 by BAGHEL et al., entitled "SHARED INFORMATION FOR INTER-USER EQUIPMENT COORDINATION ON A SIDELINK CHANNEL," filed Apr. 10, 2020, assigned to the assignee hereof, and expressly incorporated by reference herein.

FIELD OF TECHNOLOGY

The following relates generally to wireless communications and more specifically to shared information for inter-user equipment (UE) coordination on a sidelink channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as UE.

Some wireless communication systems may support sidelink communications. Sidelink communications may support communications within a group of UEs. For example, sidelink communications may include communications between a first UE and one or more other UEs within a coverage area. Sidelink communications may be improved, so that UEs may communicate with high reliability.

SUMMARY

The described techniques relate to improved methods, systems, devices, and apparatuses that support shared information for inter-user equipment (UE) coordination on a sidelink channel. Generally, the described techniques provide for efficient latency reduction techniques and reliable communications. The described techniques may enable a communication device, which may be a UE in a wireless communications system (e.g., a vehicle-to-everything (V2X) system, a vehicle-to-vehicle (V2V) network, a cellular V2X (C-V2X) network, a device-to-device (D2D) system, and the like) to indicate a priority in resource information for inter-UE coordination in sidelink communications. According to one or more aspects, a UE may receive a resource allocation for a sidelink channel and may monitor control information of other nearby UEs to generate resource information. The UE may receive a resource map (e.g., resource information) from a second UE. The resource map may indicate time and frequency resources having scheduled transmissions, a priority level of the scheduled transmissions, and a parameter used to generate the resource map. For example, the second UE may use a first information element to indicate a priority associated with the reserved resources, and may use a second information element to indicate a reference signal received power threshold used to generate the resource map. The UE may receive the resource map and determine whether to transmit in a particular time and frequency resource with the resource allocation based on the priority level. In some cases, the UE may communicate a second sidelink transmission within the resource allocation for the sidelink channel based on the resource map.

A method for wireless communications by a first user equipment (UE) is described. The method may include receiving, from a second UE, first resource information indicating a first sidelink transmission scheduled within a first time and frequency resource of a resource allocation for a sidelink channel, a first priority level of the first resource information, and a parameter threshold used to generate the first resource information and communicating a second sidelink transmission within the resource allocation for the sidelink channel based on the first resource information.

An apparatus for wireless communications by a first UE is described. The apparatus may include a processor, memory coupled with the processor, and instructions stored in the memory. The instructions may be executable by the processor to cause the apparatus to receive, from a second UE, first resource information indicating a first sidelink transmission scheduled within a first time and frequency resource of a resource allocation for a sidelink channel, a first priority level of the first resource information, and a parameter threshold used to generate the first resource information and communicate a second sidelink transmission within the resource allocation for the sidelink channel based on the first resource information.

Another apparatus for wireless communications by a first UE is described. The apparatus may include means for receiving, from a second UE, first resource information indicating a first sidelink transmission scheduled within a first time and frequency resource of a resource allocation for a sidelink channel, a first priority level of the first resource information, and a parameter threshold used to generate the first resource information and means for communicating a second sidelink transmission within the resource allocation for the sidelink channel based on the first resource information.

A non-transitory computer-readable medium storing code for wireless communications by a first UE is described. The code may include instructions executable by a processor to receive, from a second UE, first resource information indicating a first sidelink transmission scheduled within a first time and frequency resource of a resource allocation for a sidelink channel, a first priority level of the first resource information, and a parameter threshold used to generate the first resource information and communicate a second sidelink transmission within the resource allocation for the sidelink channel based on the first resource information.

In some examples of the method, apparatuses, and non-transitory computer-readable medium described herein, communicating the second sidelink transmission may include operations, features, means, or instructions for transmitting or receiving the second sidelink transmission within a second time and frequency resource of the resource allocation that at least partially overlaps with the first time and frequency resource.

In some examples of the method, apparatuses, and non-transitory computer-readable medium described herein, communicating the second sidelink transmission may include operations, features, means, or instructions for transmitting or receiving the second sidelink transmission within a second time and frequency resource of the resource allocation that does not overlap with the first time and frequency resource.

In some examples of the method, apparatuses, and non-transitory computer-readable medium described herein, receiving the first resource information may include operations, features, means, or instructions for receiving the first resource information that indicates the parameter threshold that may be a reference signal received power threshold.

In some examples of the method, apparatuses, and non-transitory computer-readable medium described herein, communicating the second sidelink transmission may include operations, features, means, or instructions for transmitting or receiving the second sidelink transmission within a second time and frequency resource of the resource allocation that at least partially overlaps with the first time and frequency resource based on a determination that the second time and frequency resource may be available using at least one of the parameter threshold, an adjustment to the parameter threshold, the first priority level of the first resource information, a second priority level of the second sidelink transmission, or a combination thereof.

In some examples of the method, apparatuses, and non-transitory computer-readable medium described herein, communicating the second sidelink transmission may include operations, features, means, or instructions for transmitting or receiving the second sidelink transmission within a second time and frequency resource of the resource allocation that does not overlap with the first time and frequency resource based on a determination that the first time and frequency resource may be unavailable using at least one of the parameter threshold, an adjustment to the parameter threshold, the first priority level of the first resource information, a second priority level of the second sidelink transmission, or a combination thereof.

Some examples of the method, apparatuses, and non-transitory computer-readable medium described herein may further include operations, features, means, or instructions for merging the first resource information with second resource information generated by the first UE to obtain merged resource information based on determining that a priority level of the second sidelink transmission matches the first priority level of the first resource information and selecting a transmission resource within the resource allocation based on the merged resource information, where the second sidelink transmission may be communicated within the transmission resource.

Some examples of the method, apparatuses, and non-transitory computer-readable medium described herein may further include operations, features, means, or instructions for transmitting second resource information that indicates the first sidelink transmission scheduled within the first time and frequency resource of the resource allocation, the second sidelink transmission scheduled within a second time and frequency resource of the resource allocation, and that the second resource information may have the first priority level.

Some examples of the method, apparatuses, and non-transitory computer-readable medium described herein may further include operations, features, means, or instructions for receiving second resource information indicating at least one additional transmission scheduled within the resource allocation having a second priority level that differs from the first priority level, where the second sidelink transmission may be communicated within the resource allocation based on the first resource information and the second resource information.

In some examples of the method, apparatuses, and non-transitory computer-readable medium described herein, receiving the second resource information may include operations, features, means, or instructions for receiving the second resource information that indicates a second parameter threshold used to generate the second resource information.

In some examples of the method, apparatuses, and non-transitory computer-readable medium described herein, receiving the first resource information may include operations, features, means, or instructions for receiving the first resource information that indicates a time window for the first resource information.

In some examples of the method, apparatuses, and non-transitory computer-readable medium described herein, receiving the first resource information may include operations, features, means, or instructions for receiving the first resource information that indicates frequency availability data, frequency occupancy data, or both, for the resource allocation within the time window.

Some examples of the method, apparatuses, and non-transitory computer-readable medium described herein may further include operations, features, means, or instructions for receiving control signaling indicating that sharing of resource information may be permitted.

Some examples of the method, apparatuses, and non-transitory computer-readable medium described herein may further include operations, features, means, or instructions for receiving control information scheduling a third sidelink transmission within the resource allocation and indicating a priority level of the third sidelink transmission, where the second sidelink transmission may be communicated within the resource allocation based on the control information.

In some examples of the method, apparatuses, and non-transitory computer-readable medium described herein, the first resource information indicates a set of sidelink transmissions.

A method for wireless communications by a first UE is described. The method may include transmitting a first resource information indicating a first sidelink transmission is scheduled within a resource allocation for a sidelink channel, a first priority level of the first resource information, and a parameter threshold used to generate the first resource information and communicating the first sidelink transmission within the resource allocation for the sidelink channel based on the first resource information.

An apparatus for wireless communications by a first UE is described. The apparatus may include a processor, memory coupled with the processor, and instructions stored in the memory. The instructions may be executable by the processor to cause the apparatus to transmit a first resource information indicating a first sidelink transmission is scheduled within a resource allocation for a sidelink channel, a first priority level of the first resource information, and a parameter threshold used to generate the first resource information and communicate the first sidelink transmission within the resource allocation for the sidelink channel based on the first resource information.

Another apparatus for wireless communications by a first UE is described. The apparatus may include means for transmitting a first resource information indicating a first sidelink transmission is scheduled within a resource allocation for a sidelink channel, a first priority level of the first resource information, and a parameter threshold used to generate the first resource information and means for communicating the first sidelink transmission within the resource allocation for the sidelink channel based on the first resource information.

A non-transitory computer-readable medium storing code for wireless communications by a first UE is described. The code may include instructions executable by a processor to transmit a first resource information indicating a first sidelink transmission is scheduled within a resource allocation for a sidelink channel, a first priority level of the first resource information, and a parameter threshold used to generate the first resource information and communicate the first sidelink transmission within the resource allocation for the sidelink channel based on the first resource information.

Some examples of the method, apparatuses, and non-transitory computer-readable medium described herein may further include operations, features, means, or instructions for receiving, from a second UE, second resource information indicating a second sidelink transmission may be scheduled within the resource allocation, that the second resource information may have the first priority level, and that the parameter threshold was used to generate the second resource information.

In some examples of the method, apparatuses, and non-transitory computer-readable medium described herein, communicating the first sidelink transmission may include operations, features, means, or instructions for transmitting or receiving the first sidelink transmission within a first time and frequency resource of the resource allocation that at least partially overlaps with a second time and frequency resource in which the second sidelink transmission may be scheduled based on the first resource information and the second resource information.

In some examples of the method, apparatuses, and non-transitory computer-readable medium described herein, communicating the first sidelink transmission may include operations, features, means, or instructions for transmitting or receiving the first sidelink transmission within a first time and frequency resource of the resource allocation that does not overlap with a second time and frequency resource in which the second sidelink transmission may be scheduled based on the first resource information and the second resource information.

In some examples of the method, apparatuses, and non-transitory computer-readable medium described herein, receiving the second resource information may include operations, features, means, or instructions for receiving the second resource information that indicates the parameter threshold that may be a reference signal received power threshold.

In some examples of the method, apparatuses, and non-transitory computer-readable medium described herein, communicating the first sidelink transmission may include operations, features, means, or instructions for transmitting or receiving the first sidelink transmission within a first time and frequency resource of the resource allocation that at least partially overlaps with a second time and frequency resource in which the second sidelink transmission may be scheduled based on a determination that the first time and frequency resource may be available using at least one of the parameter threshold, an adjustment to the parameter threshold, the first priority level of the first resource information, a priority level of the second sidelink transmission, or a combination thereof.

In some examples of the method, apparatuses, and non-transitory computer-readable medium described herein, communicating the first sidelink transmission may include operations, features, means, or instructions for transmitting or receiving the first sidelink transmission within a first time and frequency resource of the resource allocation that does not overlap with a second time and frequency resource in which the second sidelink transmission may be scheduled based on a determination that the second time and frequency resource may be unavailable using at least one of the parameter threshold, an adjustment to the parameter threshold, the first priority level of the first resource information, a priority level of the second sidelink transmission, or a combination thereof.

Some examples of the method, apparatuses, and non-transitory computer-readable medium described herein may further include operations, features, means, or instructions for transmitting third resource information that indicates the first sidelink transmission may be scheduled within a first time and frequency resource of the resource allocation, the second sidelink transmission may be scheduled within a second time and frequency resource of the resource allocation, the third resource information may have the first priority level, and that the parameter threshold was used to generate the third resource information.

In some examples of the method, apparatuses, and non-transitory computer-readable medium described herein, receiving the second resource information may include operations, features, means, or instructions for receiving the second resource information that indicates a time window for the second resource information.

In some examples of the method, apparatuses, and non-transitory computer-readable medium described herein, receiving the second resource information may include operations, features, means, or instructions for receiving the second resource information that indicates frequency availability data, frequency occupancy data, or both, for the resource allocation within the time window.

Some examples of the method, apparatuses, and non-transitory computer-readable medium described herein may further include operations, features, means, or instructions for merging the first resource information with the second resource information to generate merged resource information based on determining that a priority level of the first sidelink transmission matches the first priority level of the first resource information and selecting a transmission resource within the resource allocation based on the merged resource information, where the first sidelink transmission may be communicated within the transmission resource.

Some examples of the method, apparatuses, and non-transitory computer-readable medium described herein may further include operations, features, means, or instructions for receiving control signaling indicating that sharing of resource information may be permitted.

Some examples of the method, apparatuses, and non-transitory computer-readable medium described herein may further include operations, features, means, or instructions for receiving control information scheduling a second sidelink transmission within the resource allocation and indicating a priority level of the second sidelink transmission, where the first sidelink transmission may be communicated within the resource allocation based on the control information.

DETAILED DESCRIPTION

Figure 1:
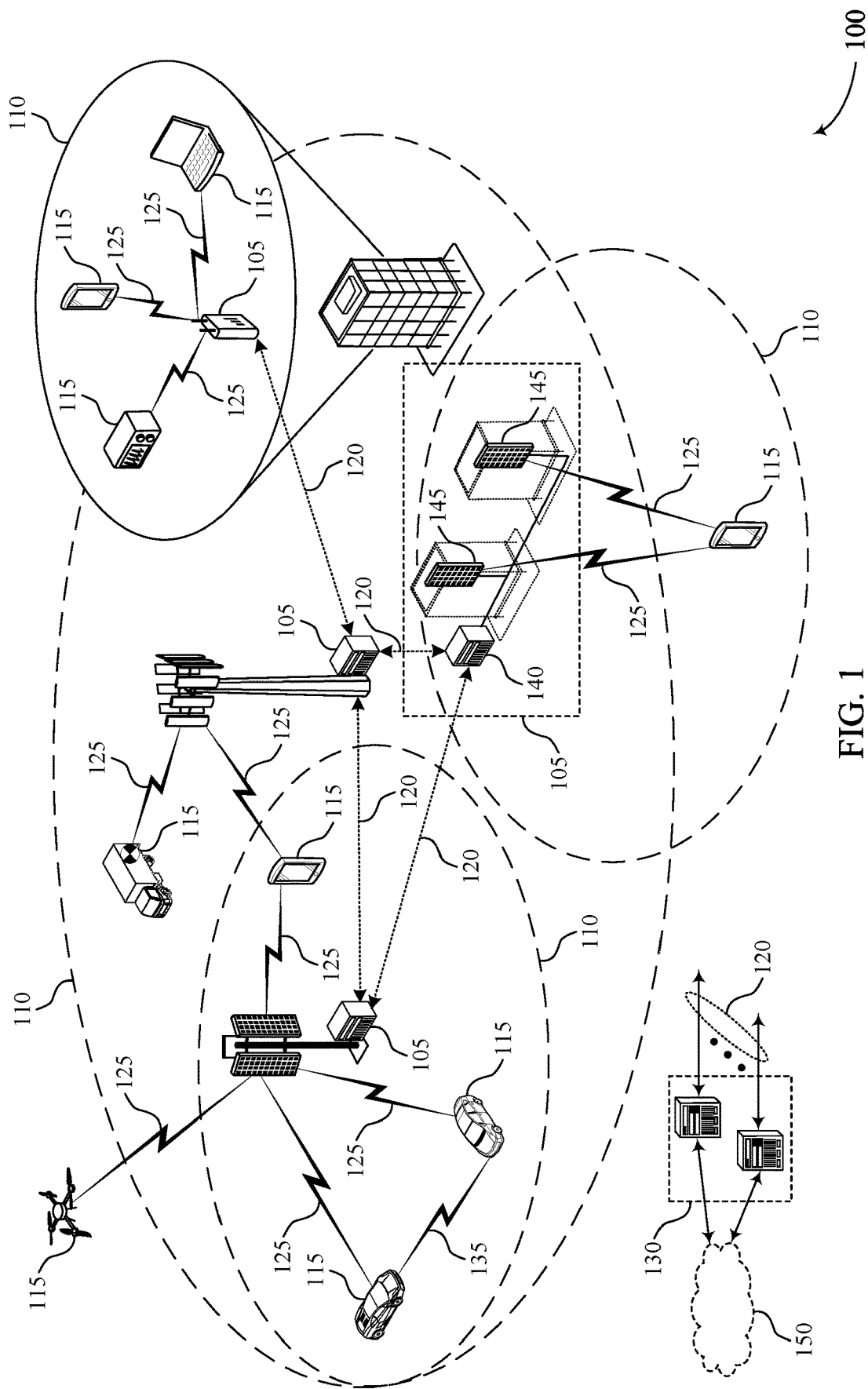
FIG. 1 illustrates an example of a wireless communications system in accordance with aspects of the present disclosure.

A wireless communications system may support both access links and sidelinks for communications between one or more communication devices. An access link may refer to a communication link between a user equipment (UE) and a base station. For example, an access link may support uplink signaling, downlink signaling, connection procedures, etc. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications may support communications within a group of UEs. For example, sidelink communications may include communications between a UE and other UEs within a coverage area including the group of UEs (e.g., a coverage area provided by a base station, a coverage area outside of the coverage area provided by the base station, or a combination thereof). One or more of the UEs in the group of UEs may initiate sidelink communications with other UEs in the group of UEs. For example, a UE may have information to transmit to the group of UEs (e.g., a detection of an object or obstacle on a road in a V2X system, scheduling information, among other examples) and the UE may initiate a sidelink communication including the information to the other UEs. The other UEs may monitor sidelink resource pools for the sidelink communications. In some examples, base stations may not be involved in sidelink communications because multiple UEs on the sidelink may receive a data transmission from a single UE, or a single UE may receive data transmissions from multiple UEs. In some examples, V2X communication may support two modes of resource allocation mechanism. In mode 1, a resource may be scheduled by a base station, and in mode 2, a UE may perform autonomous resource selection. In wireless communications systems supporting sidelink communications, inter-UE coordination may be implemented to improve reliability and efficiency. In case of mode 2 operation, each transmitting UE may perform a sensing operation to find occupied and/or available resources to utilize for an upcoming transmission. For example, UEs participating in sidelink communications may share resource information (e.g., a resource map) indicating time and frequency resources reserved for one or more future transmissions.

One or more aspects of the present disclosure provide for wireless communications systems supporting V2X transmission, where priority for transmitted packets are different from one transmission to another transmission. In some cases, UEs may share the sensing information that indicates different priority levels of the sensed traffic. In some examples, a UE may receive a resource allocation for a sidelink channel and may monitor control information of other nearby UEs to generate a resource map (e.g., resource information). The resource information may indicate time and frequency resources having one or more scheduled transmissions and a priority level of the scheduled transmissions. A UE may receive the resource information and determine whether to transmit in a particular time and frequency resource with the resource allocation based on the priority level. For example, the UE may identify an upcoming transmission (such as a packet in a buffer at the UE) and may determine a priority level of the upcoming transmission relative to the priority level of another scheduled transmission indicated in the resource information. In one example, the UE may identify a reference signal received power threshold used to generate received resource information. Upon identifying available time and frequency resources, the UE may communicate (such as transmit or receive) a second sidelink transmission using at least one of the available resources.

UEs capable of sidelink communications may utilize the techniques described herein to experience power saving, such as reduced power consumption and extended battery life while ensuring reliable and efficient communications in the group of UEs. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of additional wireless communications systems and process flows. Aspects of the disclosure are further illustrated by and described with reference to apparatus diagrams, system diagrams, and flowcharts that relate to shared information for inter-UE coordination on a sidelink channel.

FIG. 1 illustrates an example of a wireless communications system 100 that supports shared information for inter-UE coordination on a sidelink channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications system may support both access links and sidelinks for communications between one or more communication devices. An access link may refer to a communication link between a UE and a base station. A sidelink may refer to any communication link between similar wireless devices (e.g., a communication link between UEs, or a backhaul communication link between base stations). In some examples, some wireless communications systems may support two modes for resource allocation. In mode 1, a base station may allocate the resources for the UEs participating in sidelink communications. In mode 2, the UEs may perform autonomous resource selection. In some cases, UEs participating in sidelink communications may share resource information indicating time and frequency resources reserved for future transmissions. In wireless communications systems supporting V2X transmission, priority for each transmitted packet may be different from one transmission to another transmission. It may be desirable for UEs to share a priority of a transmission in order to communicate with high reliability and low latency.

According to one or more aspects of the present disclosure, the wireless communications system 100 may be configured to support sharing a priority in a resource map (e.g., resource information) for inter-UE coordination in sidelink communications. A UE 115 may receive resource map from a second UE 115. The resource map may indicate time and frequency resources having scheduled transmissions, a priority level of the scheduled transmissions, and a parameter used to generate the resource map. For example, the resource map may indicate a reference signal received power threshold used to generate the resource map. The UE 115 may receive the resource map (e.g., resource information) and determine whether to transmit in a particular time and frequency resource with the resource allocation based on the priority level. In some cases, the UE 115 may communicate a second sidelink transmission for the sidelink channel based on the resource information.

Figure 2:
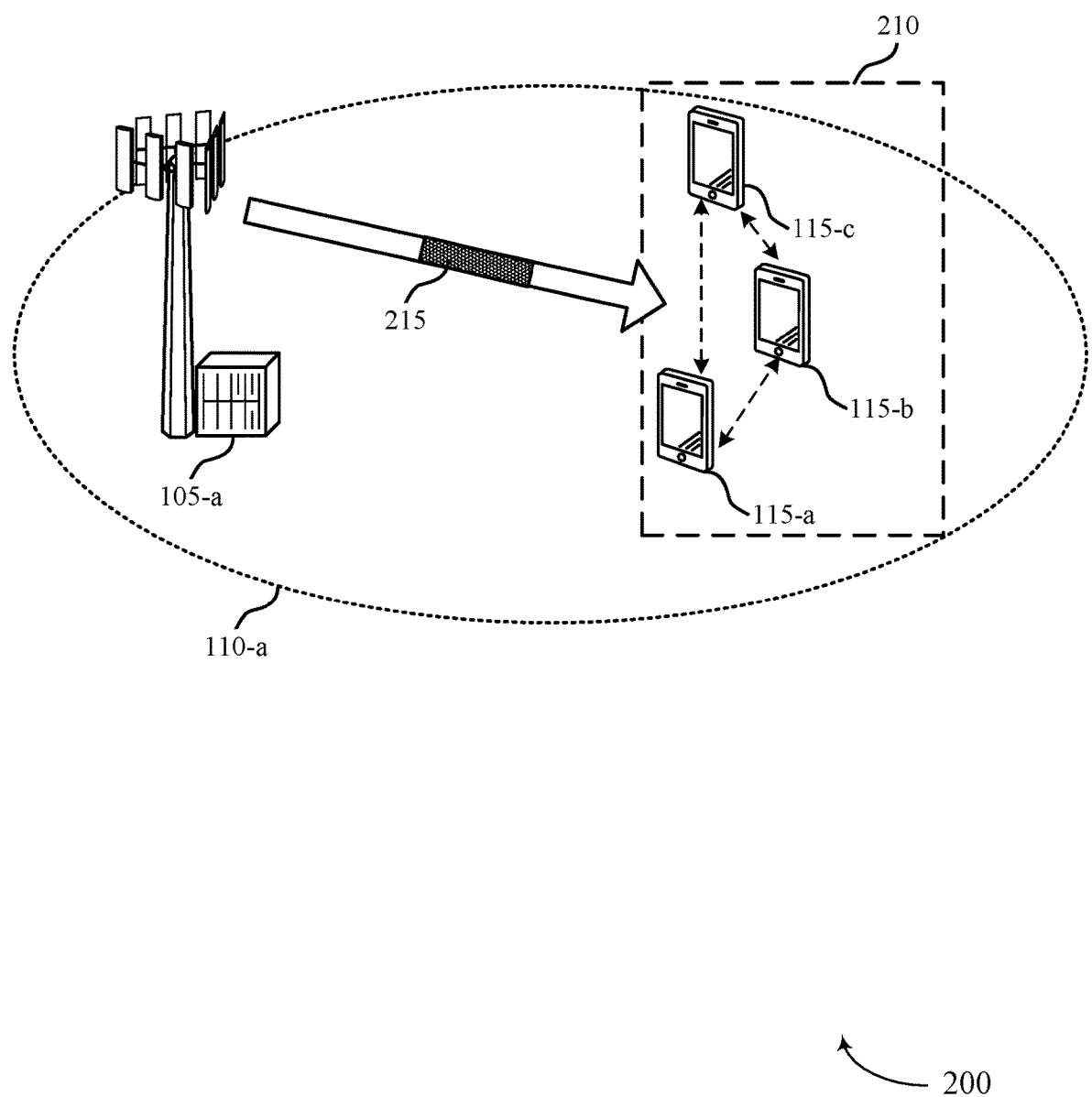
FIG. 2 illustrates an example of a wireless communications system in accordance with aspects of the present disclosure.

FIG. 2 illustrates an example of a wireless communications system 200 that supports shared information for inter-UE coordination on a sidelink channel in accordance with aspects of the present disclosure. In some examples, the wireless communications system 200 may implement aspects of wireless communications system 100. The wireless communications system 200 includes base station 105-a, geographic coverage area 110-a, and one or more UEs 115. In some cases, the wireless communications system 200 may utilize control signaling to schedule resources for UEs 115 to perform sidelink communications. Additionally or alternatively, the UEs 115 in the wireless communications system 200 may utilize shared information to enhance scheduling, inter-UE coordination, and communications flexibility. In some examples, the group of UEs 115 (e.g., UE 115-a, UE 115-b, and UE 115-c) may communicate with each other (e.g., within a V2X system, a D2D system, and the like) and may employ sidelink transmissions to save power, reduce latency, and ensure reliable communications. In some examples, vehicles may communicate using V2X resource allocation mode 2 (that utilizes UE autonomous resource selection).

The wireless communications system 200 may support both access links and sidelinks for communications between one or more communication devices. An access link may refer to a communication link between a UE 115 (such as, UE 115-a and UE 115-b) and a base station 105-a. A sidelink may refer to any communication link between similar wireless devices (e.g., a communication link between UEs, or a backhaul communication link between base stations). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE to one or more other UEs.

Base station 105-a may communicate with one or more UEs 115 (e.g., UEs 115-a, 115-b, and 115-c), which may be included within a UE group 210. For example, base station 105-a may transmit control information to UE 115-a, UE 115-b, or UE 115-c. As depicted in the example of FIG. 2, the UE 115-a, the UE 115-b, and the UE 115-c may communicate with each other (or with another group of UEs 115) over sidelink communications (e.g., using a peer-to-peer (P2P) or D2D protocol). In some cases, the UE 115-a may transmit sidelink transmissions to the UE 115-b or the UE 115-c. In some examples, UE 115-a or UE 115-b may monitor resource pools for the sidelink communications or indications of the sidelink communications (e.g., resource reservations, control channel transmissions, among other examples) from other UEs 115 in the group. Additionally or alternatively, the UEs 115 may have data to transmit to (or receive from) one or more of the UEs 115 in the group and may use the sidelink communications to transmit the data transmission. In some examples, the group of UEs 115 may utilize sidelinks communications in addition to access links with the base station 105-a.

In some examples, sidelink communications may support communications within a group of UEs 115 (e.g., group 210). For instance, sidelink communications may include communications between a UE (such as, UE 115-a, UE 115-b, and UE 115-c) and other UEs 115 within a coverage area including the group of UEs (e.g., a coverage area provided by a base station, a coverage area outside of the coverage area provided by the base station, or a combination thereof). One or more of the UEs 115 in the group of UEs 115 may initiate sidelink communications with other UEs in the group of UEs. For example, one or more of the UEs 115 may be in a coverage area 110-a (e.g., a coverage area 110 with reference to FIG. 1) of the base station 105-a. In such examples, a UE 115 may communicate with the base station 105-a via a Uu interface (e.g., the base station 105-a may transmit downlink communications to one or more of the UEs 115 via an access link). In some other examples, the group of UEs 115 may not be inside the coverage area or may not communicate with the base station 105-a using an access link.

In some cases, a UE 115 (such as, UE 115-a, UE 115-b, and UE 115-c) may have information (e.g., a detection of an object or obstacle on a road in a V2X system, scheduling information, among other examples) to transmit to the group of UEs 115, and the UE 115 may initiate sidelink communications including the information to the other UEs 115. In such cases, the UE 115 initiating the sidelink communications may be referred to as a transmitting UE and the UE 115 receiving the sidelink communications may be referred to as a receiving UE. In some examples, the base station 105-a may configure sidelink communication resources for the group of UEs using a configuration message (e.g., semi-persistent scheduling configuration message). In one example, the base station 105-a may communicate a control signaling 215 indicating a resource allocation for one or more UEs included in the group of UEs.

In some wireless communications systems, a UE from the group of UEs may be allowed to select sidelink transmission resources. In some examples, NR V2X communication may support two modes of resource allocation mechanism: Mode 1 (where the resource is scheduled by a base station) and Mode 2 (where the UE performs an autonomous resource selection). In some cases, reliability may be an issue for sidelink communications, and inter-UE coordination may help improve reliability in sidelink communications. In case of Mode 2 operation, each transmitting UE may perform a sensing operation to find occupied or available resources for transmission. For example, devices (receivers and transmitters) may perform a sensing operation before transmitting.

In one example, a set of resources may be selected at a first UE (such as UE 115-a). When operating in mode 2, the first UE (UE 115-a) may then send the selected set of resources to a second UE (such as UE 115-b). The second UE (UE 115-b) may take the resources selected by the first UE (UE 115-a) in account in the resource selection for its own transmission. For example, one or more devices performing sidelink communications (e.g., UE 115-b) may listen to a channel and decode the received information prior to selecting resources for its own transmission. In one example, the second UE 115-b may determine which UE has reserved some of the resources for its upcoming transmission prior to selecting transmission resources. By receiving the information associated with resources selected by another UE, the receiving UE may construct resource information (e.g., a resource map) of time and frequency resources which are already reserved by other UEs. In some examples, upon contrasting the resource information of time and frequency resources, a UE may analyze the resource information to identify resources which are available for its own transmission (i.e., resources which are occupied or not occupied by other UEs). In some cases, the UE may consider a reference signal received power threshold used to generate received resource information to determine which resources are occupied or not occupied by other UEs. In some examples, the reference signal received power threshold may be based on a comparison between a type of priority associated with a packet included in a buffer of the UE and a priority of the packets indicated by other UEs while reserving a time and frequency resource.

In some cases, upon receiving a time-frequency resource map (e.g., resource information), a UE may be configured to remove some resource reservations by tweaking the reference signal received power threshold. For example, if a UE determines that a channel is completely occupied, the UE can account for the reference signal received power threshold associated with resource information to remove some transmissions when selecting one or more resources for transmission. That is, if the UE determines that a reference signal received power is low, then the UE may determine that the transmitting device is far away and may not cause any interference if the UE transmits within a resource that at least partially overlaps with another scheduled resource indicated in the resource information. Additionally or alternatively, control channel reference signals or data channel reference signals may be used to determine the reference signal received power. In one example, a UE may transmit a control channel and a data channel. The control channel may indicate at least one of a number of occupied time resources and frequency resources, a modulation and coding scheme, a rank, or a combination thereof. In some cases, the control channel may also indicate any future reservations (e.g., for retransmission is response to receiving a HARQ feedback) made by one or more UEs. That is, one or more UEs may use reserved resources indicated by the future reservations to perform one or more retransmission.

In some examples, a UE may be provided with configuration for different operations from a base station (using system information block/dedicated RRC) or pre-configured for out of coverage operation. In some cases, a pre-configuration may provide a time window (in terms of milliseconds, slots, or other TTI) for which sensing information is shared between one or more UEs. Sensing information may be based on per subchannel availability/occupancy in the pre-configured future window. For example, the sensing information may be pre-configured for each resource pool based on whether sensing information can be shared or not.

As part of the inter-UE co-ordination described herein, sensing information may be shared between multiple UEs. In wireless communications systems (such as wireless communications system 200) supporting V2X communications, a priority for each transmitted packet can be different from one transmission to another transmission. For example, each transmitter may have its own data to be transmitted which can have different priority levels. In some cases, a priority level may be associated with a type of application included in a transmission. When sharing co-ordination information, a UE may not know the priority level of another UE. One or more aspects of the present disclosure provide for sharing of sensing information for different priority levels. For instance, to handle co-ordination between different priority levels for different transmissions, UEs may share sensing information that indicates different priority levels of the sensed traffic. In addition to the priority levels, one or more UEs may also report a reference signal received power threshold used to generate resource information. Thus, aspects of the present disclosure provide for co-ordination of information between UEs considering resource allocation requirements for a transmitter UE for different priority (such as quality of service) levels.

According to one or more aspects of the present disclosure, a UE (such as UE 115-a, UE 115-b, or UE 115-c) may receive a resource allocation for a sidelink channel and may monitor control information of other nearby UEs to generate resource information (e.g., a resource map). The resource map may indicate which resources within the resource allocation have scheduled transmissions and a priority level of the scheduled transmissions. A UE may receive the resource map and determine whether to transmit in a particular time and frequency resource with the resource allocation based on the priority level. For example, the UE may determine a priority level of its transmission relative to the priority level of another scheduled transmission. The UE may also consider a reference signal received power threshold used to generate received resource information (e.g., a received resource map). If the reference signal received power threshold is sufficiently low for a potentially conflicting transmission, the UE may transmit within a particular time and frequency resource that at least partially overlaps with another scheduled transmission because interference caused by transmitting the two transmissions within an overlapping resource is likely to be low or manageable.

The wireless communications system 200 may support different cast types such as broadcast, groupcast and unicast. In some examples, connectionless groupcast, connection oriented groupcast, or both, may be supported. In some cases, a configuration for different operations are provided by a base station 105-a (e.g., gNB) via control signaling (e.g., a system information block (SIB), RRC dedicated signaling, etc.)) or pre-configured (e.g., for out of coverage operation).

Additionally or alternatively, the base station 105-a and UE 115 may be able to operate in-coverage, partial coverage, and out-of-coverage and may be able to address consecutive packet loss in all coverage scenarios. As described herein, the base station 105-a may indicate one or more resources to be used by one or more UEs 115 for sidelink communications. In some cases, a first UE 115-a may receive an indication that sharing of resource map information across multiple UEs is permitted. In some examples, the first UE 115-a may receive first resource information from a second UE 115-b. The first resource information may indicate a first sidelink transmission scheduled within a first time and frequency resource, a first priority level of the first resource information, and a parameter threshold used to generate the first resource information. For instance, the second UE 115-b may indicate time and frequency resources reserved for an upcoming transmission, the first priority level associated with the upcoming transmission, and a reference signal received power threshold used to generate the resource information. In one example, the second UE 115-b may use a first information element to indicate the first priority level associated with the upcoming transmission and a second information element to indicate the reference signal received power threshold. Upon receiving the resource information, the first UE 115-a may communicate a second sidelink transmission within the resource allocation for a sidelink channel based on the first resource information.

According to one or more aspects, the first UE 115-a may identify a second time and frequency resource of the resource allocation for the second sidelink transmission. In one example, the second time and frequency resource of the resource allocation may at least partially overlap with the first time and frequency resource. Alternatively, the second time and frequency resource of the resource allocation may not overlap with the first time and frequency resource. For example, upon receiving the resource map from the second UE 115-b, the first UE 115-a may identify the time and frequency resources (e.g., resources associated with upcoming sidelink communications) to be occupied in a future time window. The first UE 115-a my then transmit or receive the second sidelink transmission based on identifying the second time and frequency resource. In some cases, the first UE 115-a may receive control information and data from the second UE 115-b. The first UE 115-a may analyze the control message to identify a priority of the upcoming transmission. The first UE 115-*a* may then identify a priority associated with upcoming transmission at the first UE 115-*a*.

In some cases, the first UE 115-*a* may determine that the second time and frequency resource is available using an adjustment to the reference signal received power threshold, the first priority level of the first resource map, and a second priority level of the second sidelink transmission. In some cases, the first UE 115-*a* may transmit or receive the second sidelink transmission within the second time and frequency resource of the resource allocation that at least partially overlaps with the first time and frequency resource based on adjusting the reference signal received power threshold. For example, the first UE 115-*a* may use the reference signal received power threshold to determine time and frequency resources available for upcoming transmissions. If the first UE 115-*a* determines that time and frequency resources are unavailable, then the first UE 115-*a* may compare a priority associated with an upcoming transmission at the first UE 115-*a* with the priority identified from the resource map. In some examples, if the first UE 115-*a* determines that the upcoming transmission has a higher priority, then the first UE 115-*a* may adjust the reference signal received power threshold used to identify available resources. Alternatively, the first UE 115-*a* may determine that the upcoming transmission has a lower priority than the first time and frequency resource. In this case, the first UE 115-*a* may transmit or receive the second sidelink transmission within a second time and frequency resource of the resource allocation that does not overlap with the first time and frequency resource.

According to one or more aspects of the present disclosure, the first UE 115-*a* may merge the received resource information (e.g., first resource map) with second resource information (e.g., second resource map) generated by the first UE 115-*a* to obtain merged resource information (e.g., merged resource map). In some cases, the first UE 115-*a* may merge the resource information upon determining that an upcoming transmission at the first UE 115-*a* has the same priority as an upcoming transmission indicated by the resource information (i.e., upcoming transmission at the second UE 115-*b*). In some cases, the first UE 115-*a* may select a transmission resource within the resource allocation based on the merged resource information. Additionally or alternatively, the first UE 115-*a* may transmit second resource information to a third UE 115-*c*. In some cases, the second resource information may indicate the first sidelink transmission scheduled within the first time and frequency resource of the resource allocation, the second sidelink transmission scheduled within a second time and frequency resource of the resource allocation, and that the second resource information has the first priority level.

In some cases, the first UE 115-*a* may receive a second resource map (e.g., second resource information) indicating at least one additional transmission scheduled within the resource allocation having a second priority level that differs from the first priority level. For instance, the first UE 115-*a* may receive multiple resource maps, where each resource map is associated with a priority level. Additionally or alternatively, each resource map may also indicate a parameter threshold (e.g., reference signal received power threshold) used to generate the resource map. In some examples, the resource maps may also indicate the time window associated with each resource map, and frequency availability data, frequency occupancy data, or both, for the resource allocation within the time window.

One or more aspects of the present disclosure provide for a distributed algorithm for coordinating transmissions between multiple UEs. Information may be shared between UEs considering resource allocation specifications for a transmitter UE for different priority levels (e.g., different quality of service (QoS) levels). Specifically, the distributed algorithm may provide for transmitting one or more packets, where each packet has an associated quality of service, a priority level, and a packet delay budget.

Figure 3:
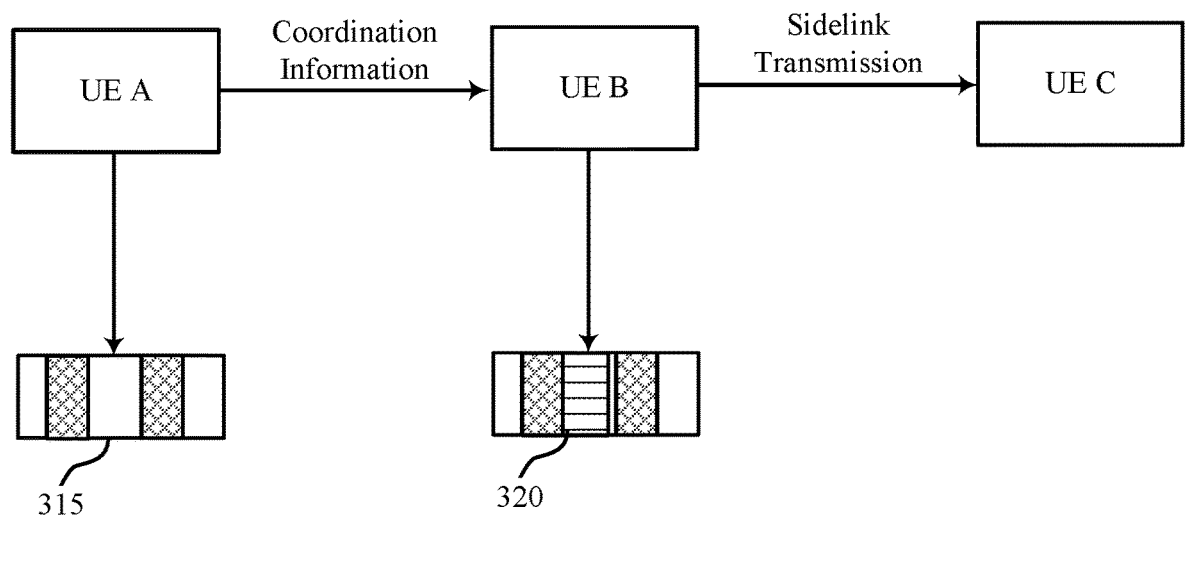
FIG. 3 illustrates an example of a process flow in accordance with aspects of the present disclosure.
Figure 3:
Figure 3:
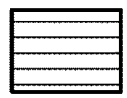

FIG. 3 illustrates an example of a process flow 300 that supports shared information for inter-UE coordination on a sidelink channel in accordance with aspects of the present disclosure. In some examples, the process flow 300 may implement aspects of the wireless communications system 100 and 200 described with reference to FIGS. 1 and 2, respectively. For example, the process flow 300 may describe inter-UE coordination by sidelink communication. Specifically, the process flow 300 describes including priority level in resource information and sharing the resource information between multiple UEs. The process flow 300 may be implemented by the UE A, UE B, and UE C. The UE A, the UE B, and the UE C may be examples of a UE 115, as described with reference to FIGS. 1 and 2.

As described in the example of FIG. 3, the UE A may identify a first sidelink transmission. For example, the first sidelink transmission may be an upcoming transmission at the UE A. The UE A may identify that the first sidelink transmission is scheduled within a first time and frequency resource 305. The UE A may generate resource information 315 (e.g., resource map) based on identifying the first time and frequency resource 305. In some examples, the first resource information 315 (e.g., resource map) may indicate the first sidelink transmission scheduled within the first time and frequency resource 305, a first priority level of the first resource information 315, and a parameter threshold used to generate the first resource information 315. For instance, the UE A may include an information element indicating the first priority level in the first resource information 315. Additionally or alternatively, the UE A may include another information element indicating a reference signal received power threshold used to generate the first resource information 315.

In some cases, the UE A may transmit coordination information to the UE B. In some examples, the coordination information may include the first resource information 315. The UE B may receive the coordination information and may identify the first sidelink transmission scheduled within the first time and frequency resource 305, the first priority level of the first resource information 315, and the parameter threshold used to generate the first resource information 315. For example, the UE B may identify the received power threshold used by the UE A to generate the first resource information 315. In some cases, the UE B may identify a second sidelink transmission. The UE B may identify a second time and frequency resource 310 for transmitting the second sidelink transmission. In some examples, the UE B may identify the second time and frequency resource 310 based on the received power threshold used to generate the first resource information 315. Although not depicted herein, the second time and frequency resource 310 may at least partially overlap with the first time and frequency resource 305. Alternatively, the second time and frequency resource 310 may not overlap with the first time and frequency resource 305.

In some cases, the UE B may generate second resource information (e.g., resource map) based on identifying the second time and frequency resource 310. The UE B may merge the first resource information 315 with second resource information generated by the UE B to obtain merged resource information 320 (e.g., merged resource map). In some examples, the UE B may obtain the merged resource information 320 based on determining that a priority level of the second sidelink transmission matches the first priority level of the first resource information 315. As described in the example of FIG. 3, the merged resource information 320 may include the first time and frequency resource 305 and the second time and frequency resource 310. Additionally or alternatively the UE B may transmit the second sidelink transmission to UE C. In some examples, the UE B may transmit the second sidelink transmission within the second time and frequency resource 310 that is determined to be available using the merged resource information 320 and that does not overlap with the first time and frequency resource 305. In some cases, when insufficient resources are determined to be available within a sidelink resource allocation from the merged resource information 320, the UE B may adjust the parameter threshold to remove any scheduled transmissions from the merged resource information 320 that do not satisfy the adjusted parameter threshold. For example, UE B may increase the reference signal receive power (RSRP) threshold at a defined priority level to remove one or more scheduled transmissions having that priority level, generated using a lower RSRP threshold, and included in the merged resource information 320, to free up available resources within the merged resource information 320 in which to transmit the second sidelink transmission.

Figure 4:
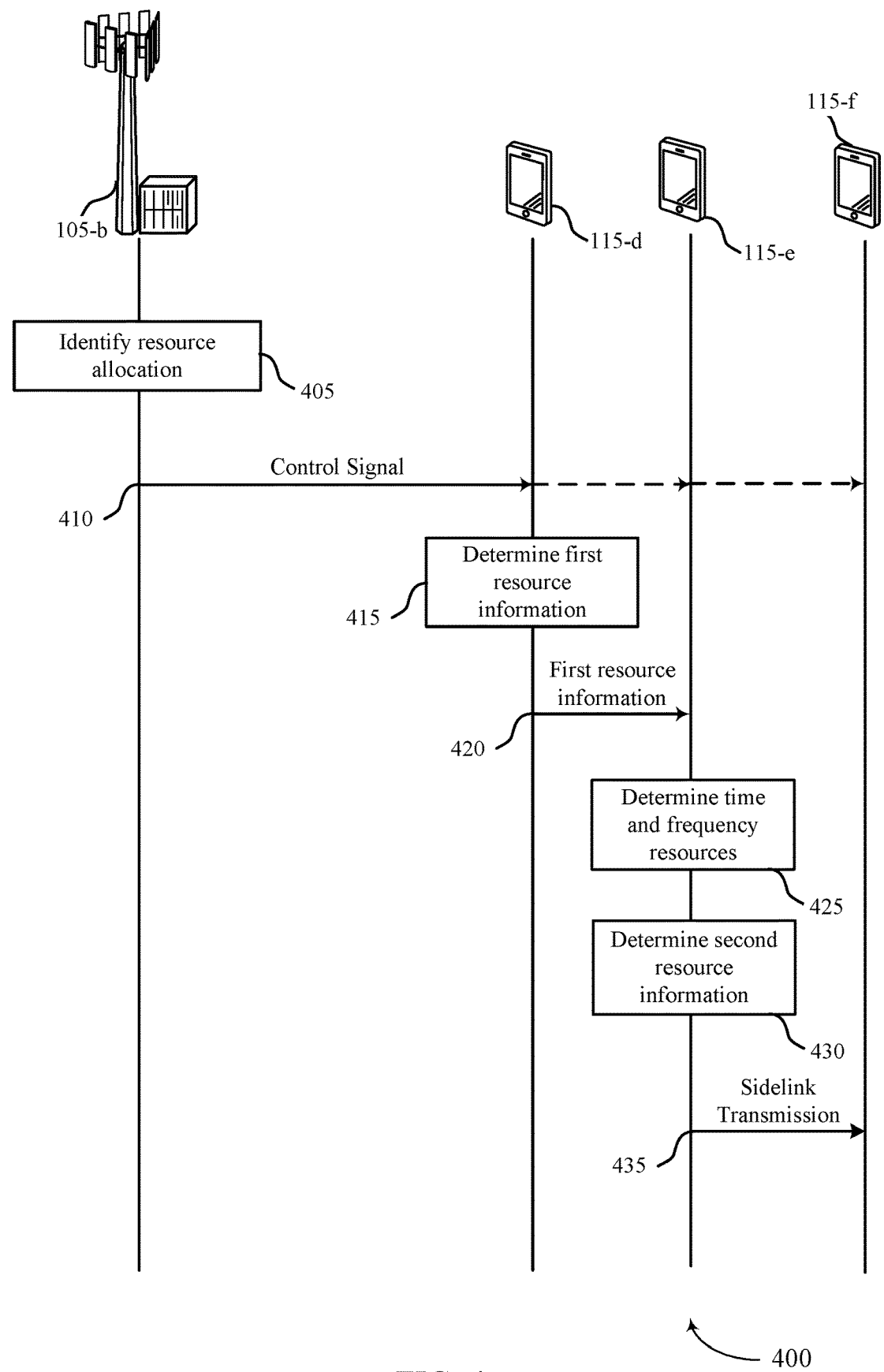
FIG. 4 illustrates an example of a process flow in accordance with aspects of the present disclosure.

FIG. 4 illustrates an example of a process flow 400 that supports shared information for inter-UE coordination on a sidelink channel in accordance with aspects of the present disclosure. In some examples, the process flow 400 may implement aspects of the wireless communications system 100 and 200 described with reference to FIGS. 1 and 2, respectively. For example, the process flow 400 may be based on one or more rules for inter-UE coordination in sidelink communication. The process flow 400 may be implemented by the UE 115-d, the UE 115-e, the UE 115-f, and the base station 105-b for reduced power consumption, and may promote low latency and low interference for wireless communications supporting high priority channels, among other benefits. The base station 105-b, the UE 115-d, the UE 115-e, and the UE 115-f may be examples of a base station 105 and a UE 115, as described with reference to FIGS. 1 and 2.

In the following description of the process flow 400, the operations between the base station 105-b, the UE 115-d, the UE 115-e, and the UE 115-f may be transmitted in a different order than the example order shown, or the operations performed by the base station 105-b, the UE 115-d, the UE 115-e, and the UE 115-f may be performed in different orders or at different times. Some operations may also be omitted from the process flow 400, and other operations may be added to the process flow 400.

At 405, the base station 105-b may identify a resource allocation for sidelink communications for the UE 115-d. Additionally or alternatively, the base station 105-b may identify a resource allocation for sidelink communications for the UE 115-e and the UE 115-f. In some examples, the configuration may be for resource allocation for a sidelink channel.

At 410, the base station 105-b may transmit, to the UE 115-d, the control signaling indicating the resource allocation for the sidelink channel. In some cases, the base station 105-b may optionally transmit the control signaling to the UE 115-e and the UE 115-f.

At 415, the UE 115-d may determine first resource information (e.g., first resource map). For example, the UE 115-d may determine a first time and frequency resource reserved for an upcoming transmission at the UE 115-d. The UE 115-d may then determine the first resource information (e.g., first resource map) based on the first time and frequency resource.

At 420, the UE 115-d may transmit the first resource information indicating a first sidelink transmission scheduled within a first time and frequency resource of the resource allocation, a first priority level of the first resource information, and a parameter threshold used to generate the first resource information. For example, the UE 115-d may transmit the first resource information indicating the reserved resources, a priority associated with the reserved resources, and a reference signal received power threshold used to generate the first resource information.

At 425, the UE 115-e may receive the first resource information and may determine a second time and frequency resource for a second sidelink transmission. In one example, the UE 115-e may determine that the second time and frequency resource of the resource allocation at least partially overlaps with the first time and frequency resource. Additionally or alternatively, the UE 115-e may determine that the second time and frequency resource of the resource allocation does not overlap with the first time and frequency resource.

In some cases, the UE 115-e may determine that the second time and frequency resource of the resource allocation at least partially overlaps with the first time and frequency resource based on a determination that the second time and frequency resource is available using an adjustment to the parameter threshold, the first priority level of the first resource information, and a second priority level of the second sidelink transmission.

At 430, the UE 115-f may determine second resource information (e.g., second resource map). In some examples, the UE 115-f may merge the first resource information with the second resource information generated by the UE 115-f to obtain merged resource information (e.g., merged resource map). In some cases, the UE 115-f may select a transmission resource within the resource allocation based on the merged resource information. For example, the UE 115-f may identify a second time and frequency resource that does not overlap with any other scheduled transmissions indicated in the merged resource information, or may at least partially overlap with a resource of a second scheduled transmission that has a lower priority, or is ignored due to the parameter threshold or by adjusting the parameter threshold.

At 435, the UE 115-f may communicate a second sidelink transmission within the resource allocation for the sidelink channel. For example, the UE 115-f may transmit or receive the second sidelink transmission within a second time and frequency resource.

Figure 5:
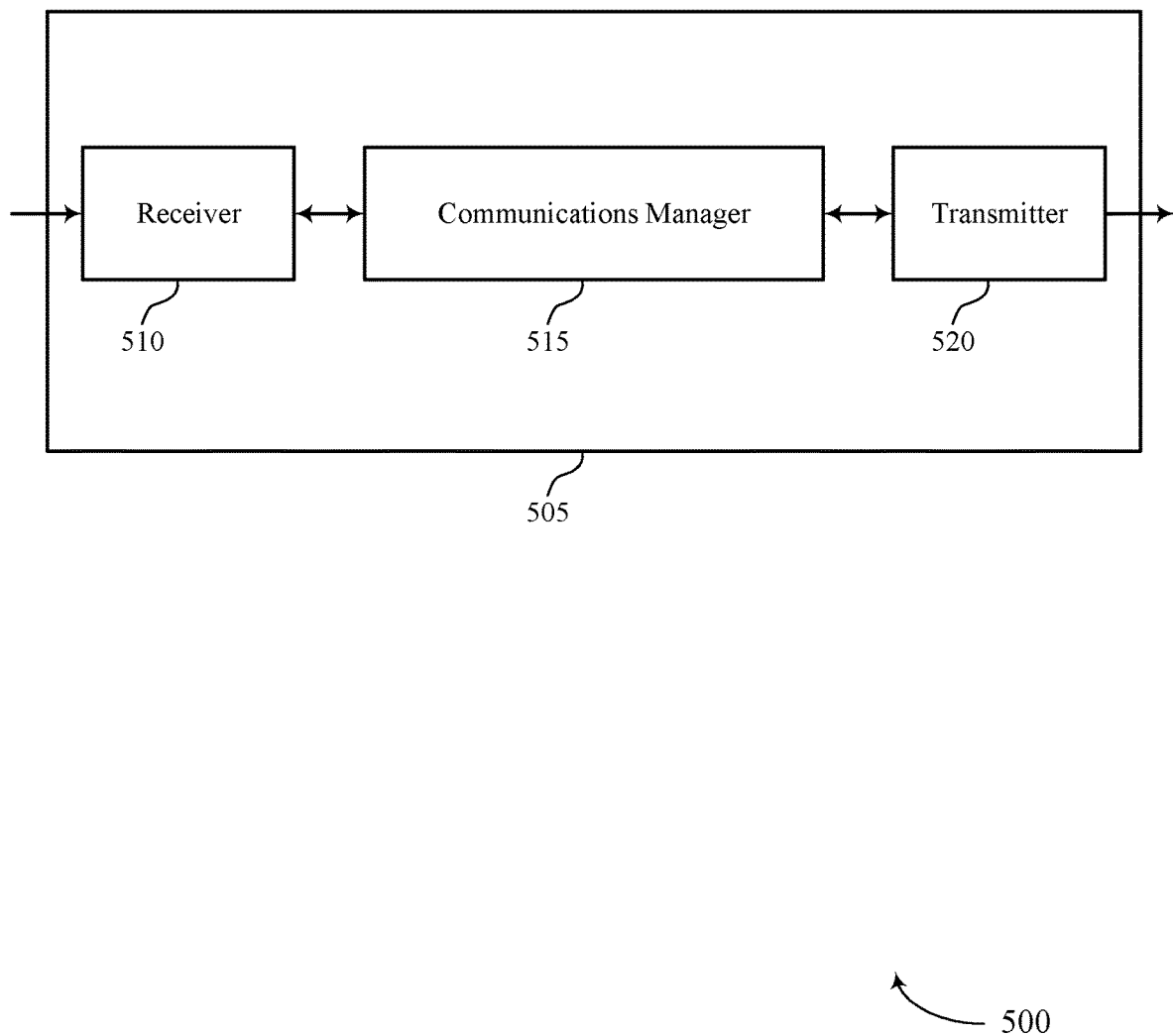
FIGS. 5 and 6 show block diagrams of devices in accordance with aspects of the present disclosure.

FIG. 5 shows a block diagram 500 of a device 505 that supports shared information for inter-UE coordination on a sidelink channel in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to shared information for inter-UE coordination on a sidelink channel, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may communicate control signaling indicating a resource allocation for a sidelink channel, receive, from a second UE, first resource information indicating a first sidelink transmission scheduled within a first time and frequency resource of the resource allocation, a first priority level of the first resource information, and a parameter threshold used to generate the first resource information, and communicate a second sidelink transmission within the resource allocation for the sidelink channel based on the first resource information. The communications manager 515 may also communicate control signaling indicating a resource allocation for a sidelink channel, transmit first resource information indicating a first sidelink transmission is scheduled within the resource allocation, a first priority level of the first resource information, and a parameter threshold used to generate the first resource information, and communicate the first sidelink transmission within the resource allocation for the sidelink channel based on the first resource information. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

By including or configuring the communications manager 515 in accordance with examples as described herein, the device 505 (e.g., a processor controlling or otherwise coupled to the receiver 510, the transmitter 520, the communications manager 515, or a combination thereof) may support techniques for reduced processing, reduced power consumption, more efficient utilization of communication resources.

Figure 6:
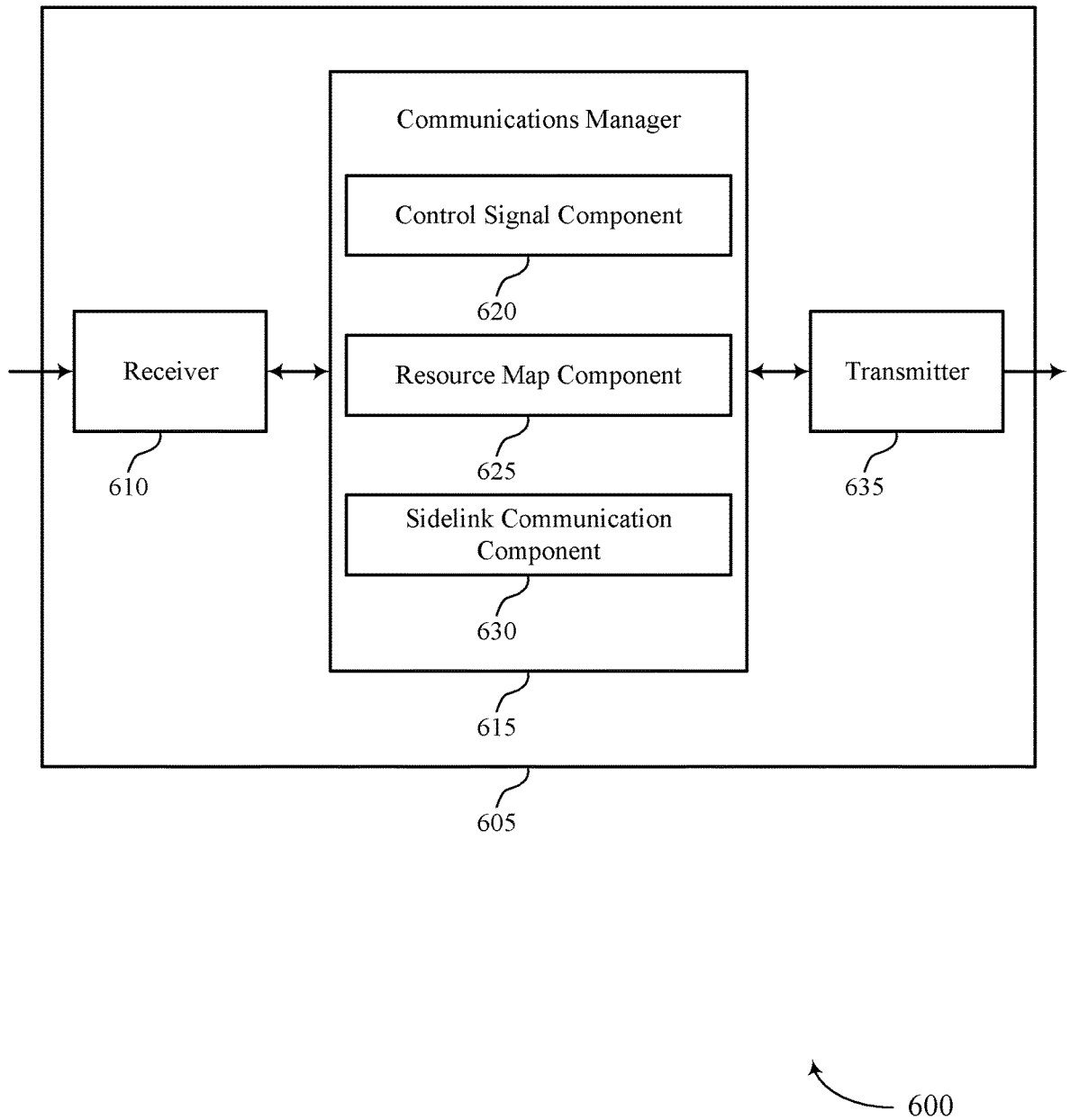

FIG. 6 shows a block diagram 600 of a device 605 that supports shared information for inter-UE coordination on a sidelink channel in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to shared information for inter-UE coordination on a sidelink channel, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a control signal component 620, a resource map component 625, and a sidelink communication component 630. The communications manager 615 may be an example of aspects of the communications manager 810 described herein.

The control signal component 620 may communicate control signaling indicating a resource allocation for a sidelink channel. The resource map component 625 may receive, from a second UE, a first resource map (e.g., first resource information) indicating a first sidelink transmission scheduled within a first time and frequency resource of the resource allocation, a first priority level of the first resource map, and a parameter threshold used to generate the first resource map. The sidelink communication component 630 may communicate a second sidelink transmission within the resource allocation for the sidelink channel based on the first resource map.

The control signal component 620 may communicate control signaling indicating a resource allocation for a sidelink channel. The resource map component 625 may transmit a first resource map indicating a first sidelink transmission is scheduled within the resource allocation, a first priority level of the first resource map, and a parameter threshold used to generate the first resource map. The sidelink communication component 630 may communicate the first sidelink transmission within the resource allocation for the sidelink channel based on the first resource map.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
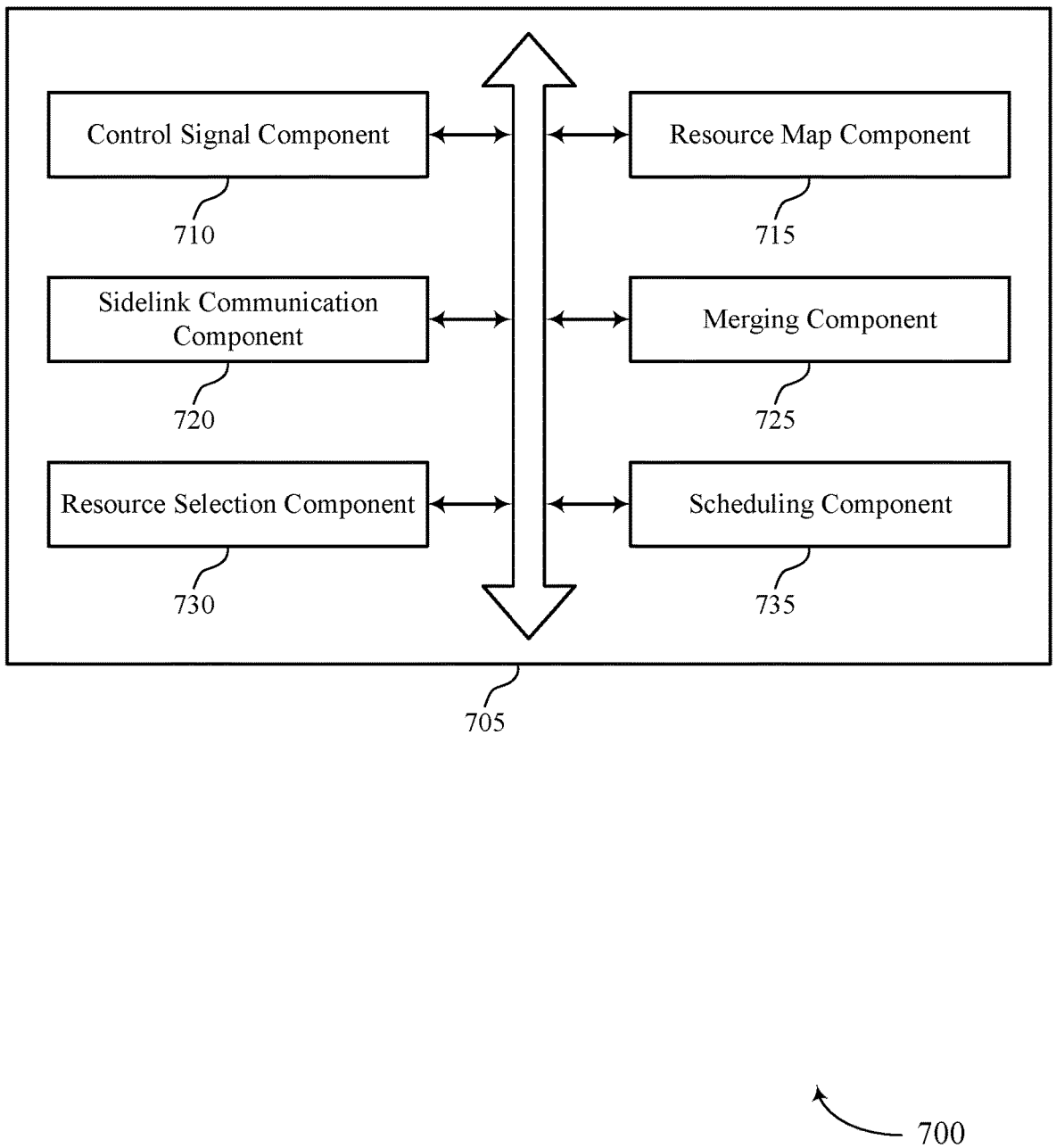
FIG. 7 shows a block diagram of a communications manager in accordance with aspects of the present disclosure.

FIG. 7 shows a block diagram 700 of a communications manager 705 that supports shared information for inter-UE coordination on a sidelink channel in accordance with aspects of the present disclosure. The communications manager 705 may be an example of aspects of a communications manager 515, a communications manager 615, or a communications manager 810 described herein. The communications manager 705 may include a control signal component 710, a resource map component 715, a sidelink communication component 720, a merging component 725, a resource selection component 730, and a scheduling component 735. Each of these modules may communicate, directly or indirectly, with one another (e.g., via one or more buses).

The control signal component 710 may communicate control signaling indicating a resource allocation for a sidelink channel. In some examples, the control signal component 710 may receive the control signaling indicating that sharing of resource map information is permitted. The resource map component 715 may receive, from a second UE, a first resource map (e.g., resource information) indicating a first sidelink transmission scheduled within a first time and frequency resource of the resource allocation, a first priority level of the first resource map, and a parameter threshold used to generate the first resource map. The sidelink communication component 720 may communicate a second sidelink transmission within the resource allocation for the sidelink channel based on the first resource map.

In some examples, the sidelink communication component 720 may transmit or receive the second sidelink transmission within a second time and frequency resource of the resource allocation that at least partially overlaps with the first time and frequency resource. In some examples, the sidelink communication component 720 may transmit or receive the second sidelink transmission within a second time and frequency resource of the resource allocation that does not overlap with the first time and frequency resource.

In some examples, the resource map component 715 may receive the first resource information that indicates the parameter threshold that is a reference signal received power threshold. In some examples, the sidelink communication component 720 may transmit or receiving the second sidelink transmission within a second time and frequency resource of the resource allocation that at least partially overlaps with the first time and frequency resource based on a determination that the second time and frequency resource is available using an adjustment to the parameter threshold, the first priority level of the first resource information, and a second priority level of the second sidelink transmission.

In some examples, the sidelink communication component 720 may transmit or receiving the second sidelink transmission within a second time and frequency resource of the resource allocation that at least partially overlaps with the first time and frequency resource based on a determination that the second time and frequency resource is available using the parameter threshold, the first priority level of the first resource information, and a second priority level of the second sidelink transmission.

In some examples, the sidelink communication component 720 may transmit or receiving the second sidelink transmission within a second time and frequency resource of the resource allocation that does not overlap with the first time and frequency resource based on a determination that the first time and frequency resource is unavailable using an adjustment to the parameter threshold, the first priority level of the first resource information, and a second priority level of the second sidelink transmission.

In some examples, the sidelink communication component 720 may transmit or receiving the second sidelink transmission within a second time and frequency resource of the resource allocation that does not overlap with the first time and frequency resource based on a determination that the first time and frequency resource is unavailable using the parameter threshold, the first priority level of the first resource information, and a second priority level of the second sidelink transmission.

The merging component 725 may merge the first resource information with second resource information generated by the first UE to obtain merged resource information based on determining that a priority level of the second sidelink transmission matches the first priority level of the first resource information. The resource selection component 730 may select a transmission resource within the resource allocation based on the merged resource information, where the second sidelink transmission is communicated within the transmission resource.

In some examples, the resource map component 715 may transmit a second resource map (e.g., second resource information) that indicates the first sidelink transmission scheduled within the first time and frequency resource of the resource allocation, the second sidelink transmission scheduled within a second time and frequency resource of the resource allocation, and that the second resource map has the first priority level.

In some examples, the resource map component 715 may receive a second resource map indicating at least one additional transmission scheduled within the resource allocation having a second priority level that differs from the first priority level, where the second sidelink transmission is communicated within the resource allocation based on the first resource map and the second resource map. In some examples, the resource map component 715 may receive the second resource map that indicates a second parameter threshold used to generate the second resource map.

In some examples, the resource map component 715 may receive the first resource information that indicates a time window for the first resource information. In some examples, the resource map component 715 may receive the first resource information that indicates frequency availability data, frequency occupancy data, or both, for the resource allocation within the time window.

The scheduling component 735 may receive control information scheduling a third sidelink transmission within the resource allocation and indicating a priority level of the third sidelink transmission, where the second sidelink transmission is communicated within the resource allocation based on the control information.

In some examples, the control signal component 710 may communicate control signaling indicating a resource allocation for a sidelink channel. In some examples, the control signal component 710 may receive the control signaling indicating that sharing of resource information is permitted.

In some examples, the resource map component 715 may transmit a first resource map (e.g., first resource information) indicating a first sidelink transmission is scheduled within the resource allocation, a first priority level of the first resource map, and a parameter threshold used to generate the first resource map. In some examples, the sidelink communication component 720 may communicate the first sidelink transmission within the resource allocation for the sidelink channel based on the first resource map.

In some examples, the resource map component 715 may receive, from a second UE, a second resource map (e.g., second resource information) indicating a second sidelink transmission is scheduled within the resource allocation, that the second resource map has the first priority level, and that the parameter threshold was used to generate the second resource map.

In some examples, the sidelink communication component 720 may transmit or receiving the first sidelink transmission within a first time and frequency resource of the resource allocation that at least partially overlaps with a second time and frequency resource in which the second sidelink transmission is scheduled based on the first resource information (e.g., first resource map) and the second resource information (e.g., second resource map).

In some examples, the sidelink communication component 720 may transmit or receiving the first sidelink transmission within a first time and frequency resource of the resource allocation that does not overlap with a second time and frequency resource in which the second sidelink transmission is scheduled based on the first resource information and the second resource information.

In some examples, the resource map component 715 may receive the second resource information that indicates the parameter threshold that is a reference signal received power threshold. In some examples, the sidelink communication component 720 may transmit or receiving the first sidelink transmission within a first time and frequency resource of the resource allocation that at least partially overlaps with a second time and frequency resource in which the second sidelink transmission is scheduled based on a determination that the first time and frequency resource is available using an adjustment to the parameter threshold, the first priority level of the first resource information, and a priority level of the second sidelink transmission.

In some examples, the sidelink communication component 720 may transmit or receiving the first sidelink transmission within a first time and frequency resource of the resource allocation that at least partially overlaps with a second time and frequency resource in which the second sidelink transmission is scheduled based on a determination that the first time and frequency resource is available using the parameter threshold, the first priority level of the first resource information, and a priority level of the second sidelink transmission.

In some examples, the sidelink communication component 720 may transmit or receiving the first sidelink transmission within a first time and frequency resource of the resource allocation that does not overlap with a second time and frequency resource in which the second sidelink transmission is scheduled based on a determination that the second time and frequency resource is unavailable using an adjustment to the parameter threshold, the first priority level of the first resource information, and a priority level of the second sidelink transmission.

In some examples, the sidelink communication component 720 may transmit or receiving the first sidelink transmission within a first time and frequency resource of the resource allocation that does not overlap with a second time and frequency resource in which the second sidelink transmission is scheduled based on a determination that the second time and frequency resource is unavailable using the parameter threshold, the first priority level of the first resource information, and a priority level of the second sidelink transmission.

In some examples, the resource map component 715 may transmit a third resource map (e.g., third resource information) that indicates the first sidelink transmission is scheduled within a first time and frequency resource of the resource allocation, the second sidelink transmission is scheduled within a second time and frequency resource of the resource allocation, the third resource information has the first priority level, and that the parameter threshold was used to generate the third resource information.

In some examples, the resource map component 715 may receive the second resource information that indicates a time window for the second resource information. In some examples, the resource map component 715 may receive the second resource information that indicates frequency availability data, frequency occupancy data, or both, for the resource allocation within the time window.

In some examples, the merging component 725 may merge the first resource information with the second resource information to generate merged resource information based on determining that a priority level of the first sidelink transmission matches the first priority level of the first resource information. In some examples, the resource selection component 730 may select a transmission resource within the resource allocation based on the merged resource information, where the first sidelink transmission is communicated within the transmission resource.

In some examples, the scheduling component 735 may receive control information scheduling a second sidelink transmission within the resource allocation and indicating a priority level of the second sidelink transmission, where the first sidelink transmission is communicated within the resource allocation based on the control information.

Figure 8:
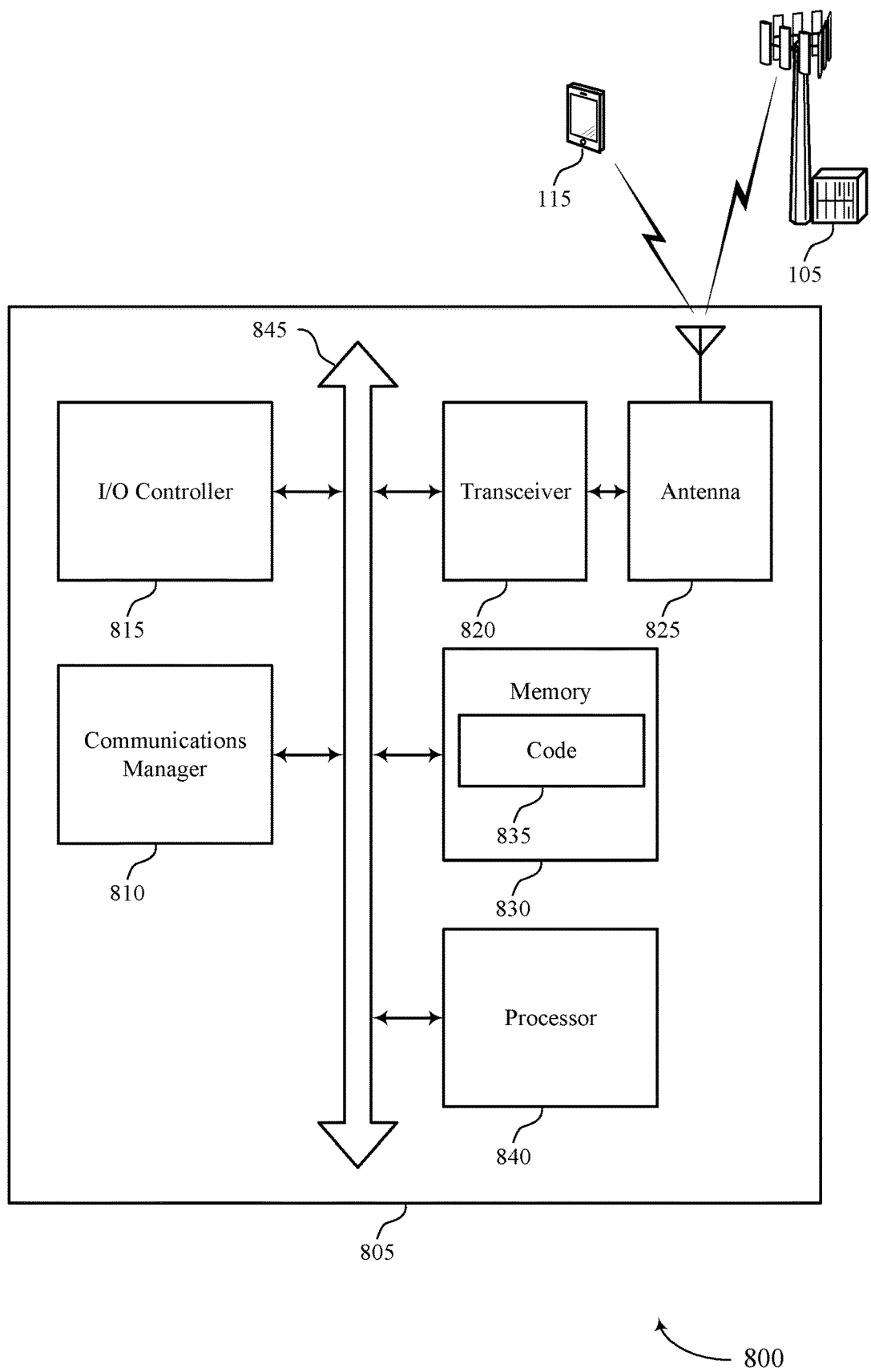
FIG. 8 shows a diagram of a system in accordance with aspects of the present disclosure.

FIG. 8 shows a diagram of a system 800 including a device 805 that supports shared information for inter-UE coordination on a sidelink channel in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may communicate control signaling indicating a resource allocation for a sidelink channel, receive, from a second UE, first resource information (e.g., a first resource map) indicating a first sidelink transmission scheduled within a first time and frequency resource of the resource allocation, a first priority level of the first resource information, and a parameter threshold used to generate the first resource information, and communicate a second sidelink transmission within the resource allocation for the sidelink channel based on the first resource information. The communications manager 810 may also communicate control signaling indicating a resource allocation for a sidelink channel, transmit first resource information indicating a first sidelink transmission is scheduled within the resource allocation, a first priority level of the first resource information, and a parameter threshold used to generate the first resource information, and communicate the first sidelink transmission within the resource allocation for the sidelink channel based on the first resource information.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting shared information for inter-UE coordination on a sidelink channel).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
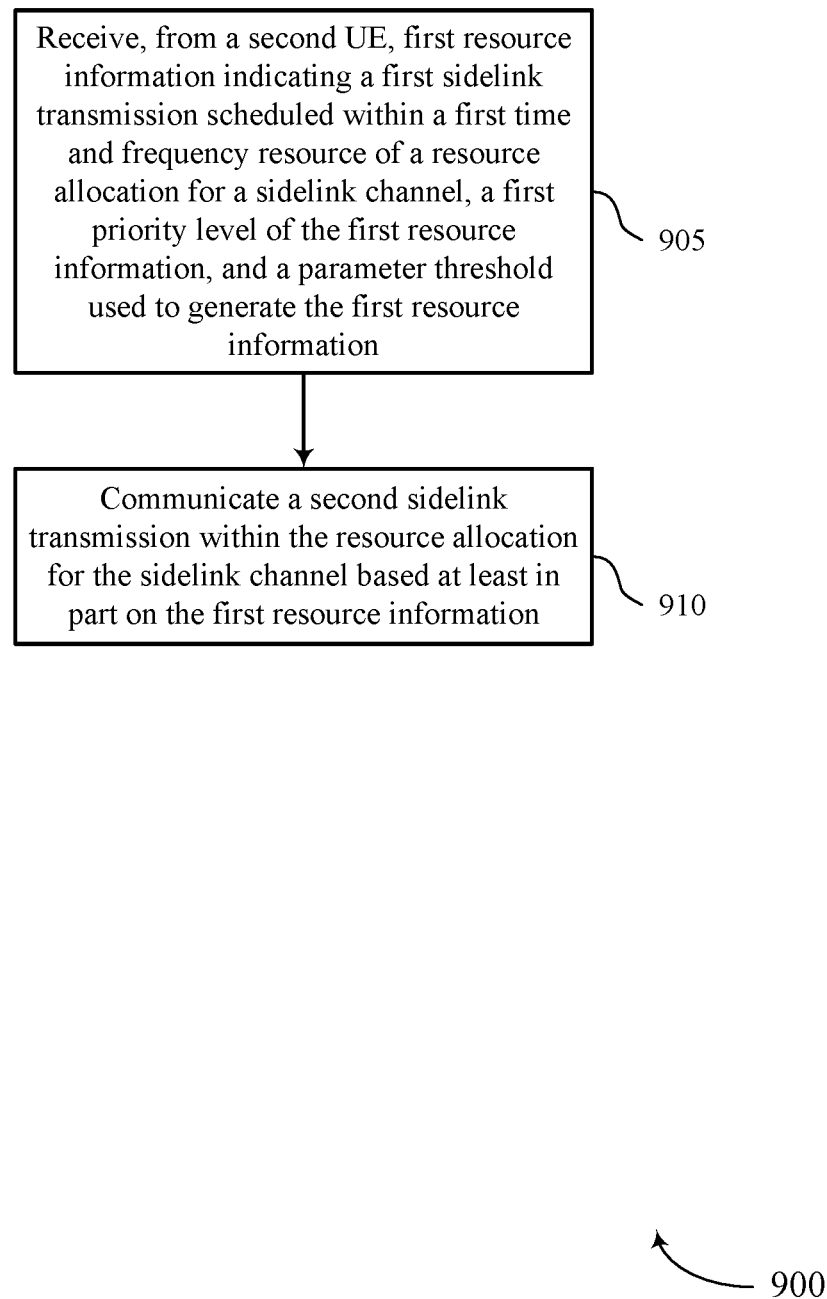
FIGS. 9 through 12 show flowcharts illustrating methods in accordance with aspects of the present disclosure.

FIG. 9 shows a flowchart illustrating a method 900 that supports shared information for inter-UE coordination on a sidelink channel in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may receive, from a second UE, first resource information indicating a first sidelink transmission scheduled within a first time and frequency resource of a resource allocation for a sidelink channel, a first priority level of the first resource information, and a parameter threshold used to generate the first resource information. The operations of 905 may be performed according to the methods described herein. In some examples, aspects of the operations of 905 may be performed by a resource map component as described with reference to FIGS. 5 through 8.

At 910, the UE may communicate a second sidelink transmission within the resource allocation for the sidelink channel based on the first resource information. The operations of 910 may be performed according to the methods described herein. In some examples, aspects of the operations of 910 may be performed by a sidelink communication component as described with reference to FIGS. 5 through 8.

Figure 10:
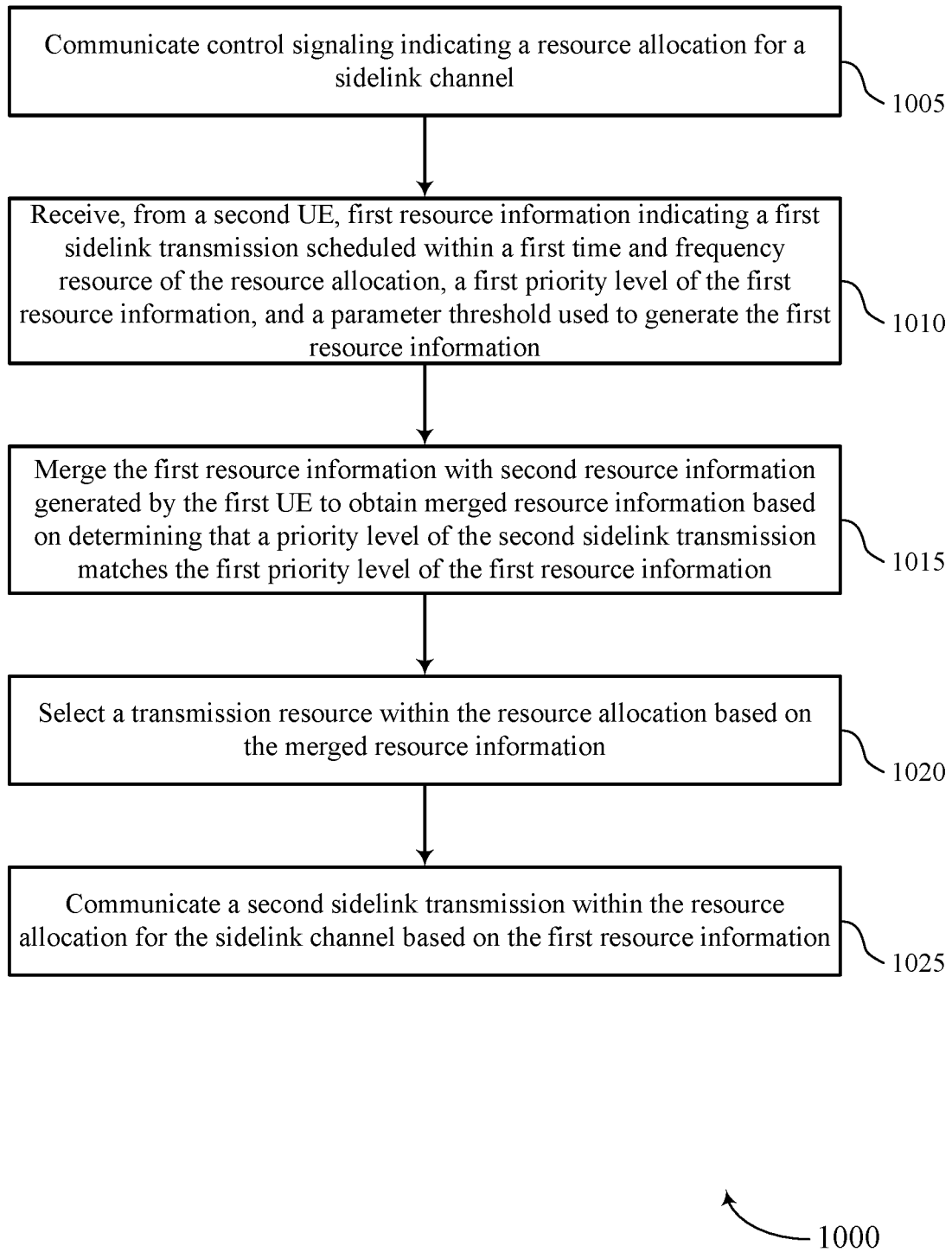

FIG. 10 shows a flowchart illustrating a method 1000 that supports shared information for inter-UE coordination on a sidelink channel in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may communicate control signaling indicating a resource allocation for a sidelink channel. The operations of 1005 may be performed according to the methods described herein. In some examples, aspects of the operations of 1005 may be performed by a control signal component as described with reference to FIGS. 5 through 8.

At 1010, the UE may receive, from a second UE, first resource information (e.g., a first resource map) indicating a first sidelink transmission scheduled within a first time and frequency resource of the resource allocation, a first priority level of the first resource information, and a parameter threshold used to generate the first resource information. The operations of 1010 may be performed according to the methods described herein. In some examples, aspects of the operations of 1010 may be performed by a resource map component as described with reference to FIGS. 5 through 8.

At 1015, the UE may merge the first resource information with second resource information generated by the first UE to obtain merged resource information based on determining that a priority level of the second sidelink transmission matches the first priority level of the first resource information. The operations of 1015 may be performed according to the methods described herein. In some examples, aspects of the operations of 1015 may be performed by a merging component as described with reference to FIGS. 5 through 8.

At 1020, the UE may select a transmission resource within the resource allocation based on the merged resource information. The operations of 1020 may be performed according to the methods described herein. In some examples, aspects of the operations of 1020 may be performed by a resource selection component as described with reference to FIGS. 5 through 8.

At 1025, the UE may communicate a second sidelink transmission within the resource allocation for the sidelink channel based on the first resource information. In some cases, the second sidelink transmission may be communicated within the transmission resource. The operations of 1025 may be performed according to the methods described herein. In some examples, aspects of the operations of 1025 may be performed by a sidelink communication component as described with reference to FIGS. 5 through 8.

Figure 11:
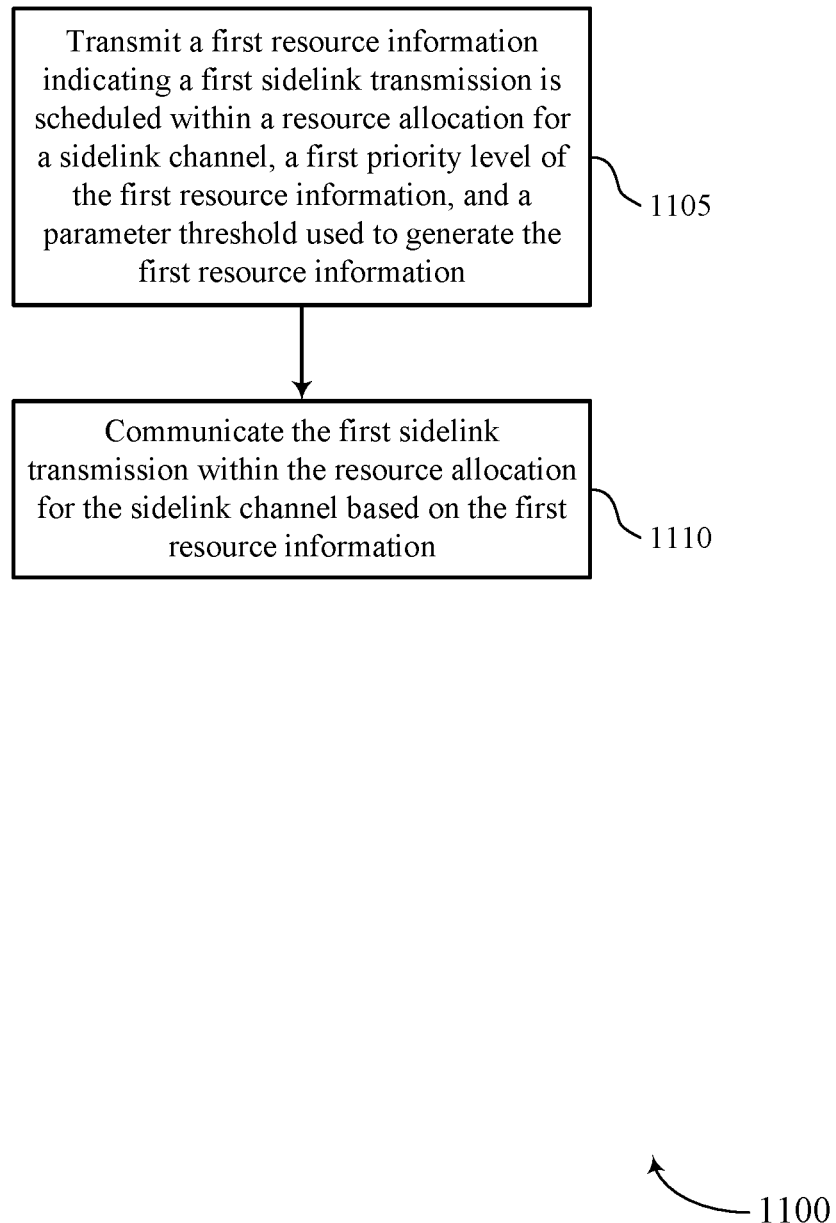

FIG. 11 shows a flowchart illustrating a method 1100 that supports shared information for inter-UE coordination on a sidelink channel in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may transmit first resource information (e.g., a first resource map) indicating a first sidelink transmission is scheduled within a resource allocation for a sidelink channel, a first priority level of the first resource information, and a parameter threshold used to generate the first resource information. The operations of 1105 may be performed according to the methods described herein. In some examples, aspects of the operations of 1105 may be performed by a resource map component as described with reference to FIGS. 5 through 8.

At 1110, the UE may communicate the first sidelink transmission within the resource allocation for the sidelink channel based on the first resource information. The operations of 1110 may be performed according to the methods described herein. In some examples, aspects of the operations of 1110 may be performed by a sidelink communication component as described with reference to FIGS. 5 through 8.

Figure 12:
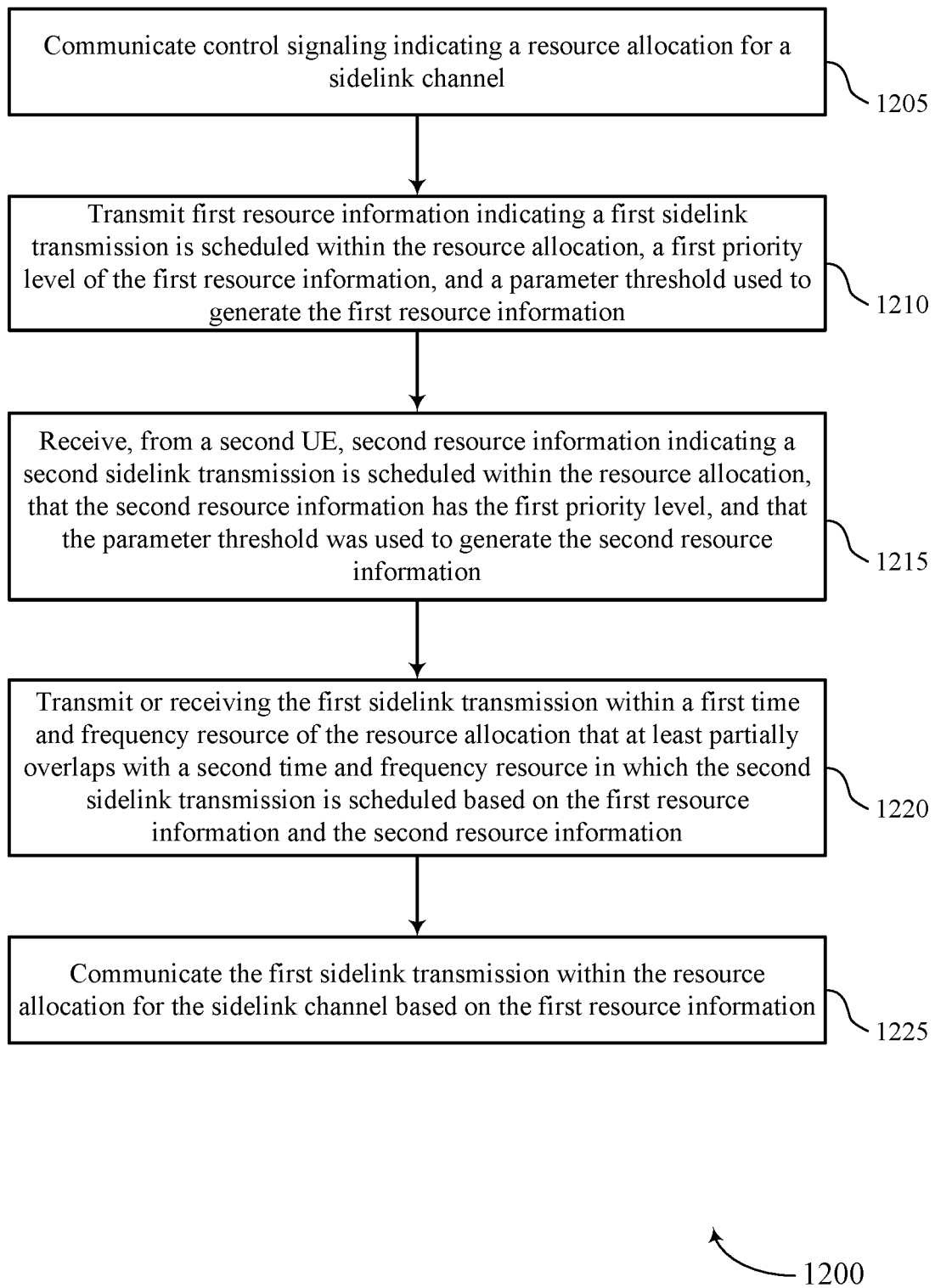

FIG. 12 shows a flowchart illustrating a method 1200 that supports shared information for inter-UE coordination on a sidelink channel in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may communicate control signaling indicating a resource allocation for a sidelink channel. The operations of 1205 may be performed according to the methods described herein. In some examples, aspects of the operations of 1205 may be performed by a control signal component as described with reference to FIGS. 5 through 8.

At 1210, the UE may transmit first resource information (e.g., a first resource map) indicating a first sidelink transmission is scheduled within the resource allocation, a first priority level of the first resource information, and a parameter threshold used to generate the first resource information. The operations of 1210 may be performed according to the methods described herein. In some examples, aspects of the operations of 1210 may be performed by a resource map component as described with reference to FIGS. 5 through 8.

At 1215, the UE may receive, from a second UE, second resource information indicating a second sidelink transmission is scheduled within the resource allocation, that the second resource information has the first priority level, and that the parameter threshold was used to generate the second resource information. The operations of 1215 may be performed according to the methods described herein. In some examples, aspects of the operations of 1215 may be performed by a resource map component as described with reference to FIGS. 5 through 8.

At 1220, the UE may transmit or receiving the first sidelink transmission within a first time and frequency resource of the resource allocation that at least partially overlaps with a second time and frequency resource in which the second sidelink transmission is scheduled based on the first resource information and the second resource information. The operations of 1220 may be performed according to the methods described herein. In some examples, aspects of the operations of 1220 may be performed by a sidelink communication component as described with reference to FIGS. 5 through 8.

At 1225, the UE may communicate the first sidelink transmission within the resource allocation for the sidelink channel based on the first resource information. The operations of 1225 may be performed according to the methods described herein. In some examples, aspects of the operations of 1225 may be performed by a sidelink communication component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications by a first UE, comprising: receiving, from a second UE, first resource information indicating a first sidelink transmission scheduled within a first time and frequency resource of a resource allocation for a sidelink channel, a first priority level of the first resource information, and a parameter threshold used to generate the first resource information; and communicating a second sidelink transmission within the resource allocation for the sidelink channel based at least in part on the first resource information.

Aspect 2: The method of aspect 1, wherein communicating the second sidelink transmission comprises: transmitting or receiving the second sidelink transmission within a second time and frequency resource of the resource allocation that at least partially overlaps with the first time and frequency resource.

Aspect 3: The method of any of aspects 1 through 2, wherein communicating the second sidelink transmission comprises: transmitting or receiving the second sidelink transmission within a second time and frequency resource of the resource allocation that does not overlap with the first time and frequency resource.

Aspect 4: The method of any of aspects 1 through 3, wherein receiving the first resource information comprises: receiving the first resource information that indicates the parameter threshold that is a reference signal received power threshold.

Aspect 5: The method of any of aspects 1 through 4, wherein communicating the second sidelink transmission comprises: transmitting or receiving the second sidelink transmission within a second time and frequency resource of the resource allocation that at least partially overlaps with the first time and frequency resource based at least in part on a determination that the second time and frequency resource is available using at least one of the parameter threshold, an adjustment to the parameter threshold, the first priority level of the first resource information, a second priority level of the second sidelink transmission, or a combination thereof.

Aspect 6: The method of any of aspects 1 through 5, wherein communicating the second sidelink transmission comprises: transmitting or receiving the second sidelink transmission within a second time and frequency resource of the resource allocation that does not overlap with the first time and frequency resource based at least in part on a determination that the first time and frequency resource is unavailable using at least one of the parameter threshold, an adjustment to the parameter threshold, the first priority level of the first resource information, a second priority level of the second sidelink transmission, or a combination thereof.

Aspect 7: The method of any of aspects 1 through 6, further comprising: merging the first resource information with second resource information generated by the first UE to obtain merged resource information based at least in part on determining that a priority level of the second sidelink transmission matches the first priority level of the first resource information; and selecting a transmission resource within the resource allocation based at least in part on the merged resource information, wherein the second sidelink transmission is communicated within the transmission resource.

Aspect 8: The method of any of aspects 1 through 7, further comprising: transmitting second resource information that indicates the first sidelink transmission scheduled within the first time and frequency resource of the resource allocation, the second sidelink transmission scheduled within a second time and frequency resource of the resource allocation, and that the second resource information has the first priority level.

Aspect 9: The method of any of aspects 1 through 8, further comprising: receiving second resource information indicating at least one additional transmission scheduled within the resource allocation having a second priority level that differs from the first priority level, wherein the second sidelink transmission is communicated within the resource allocation based at least in part on the first resource information and the second resource information.

Aspect 10: The method of aspect 9, wherein receiving the second resource information comprises: receiving the second resource information that indicates a second parameter threshold used to generate the second resource information.

Aspect 11: The method of any of aspects 1 through 10, wherein receiving the first resource information comprises: receiving the first resource information that indicates a time window for the first resource information.

Aspect 12: The method of aspect 11, wherein receiving the first resource information comprises: receiving the first resource information that indicates frequency availability data, frequency occupancy data, or both, for the resource allocation within the time window.

Aspect 13: The method of any of aspects 1 through 12, further comprising: receiving control signaling indicating that sharing of resource information is permitted.

Aspect 14: The method of any of aspects 1 through 13, further comprising: receiving control information scheduling a third sidelink transmission within the resource allocation and indicating a priority level of the third sidelink transmission, wherein the second sidelink transmission is communicated within the resource allocation based at least in part on the control information.

Aspect 15: The method of any of aspects 1 through 14, wherein the first resource information indicates a plurality of sidelink transmissions.

Aspect 16: A method for wireless communications by a first UE, comprising: transmitting a first resource information indicating a first sidelink transmission is scheduled within a resource allocation for a sidelink channel, a first priority level of the first resource information, and a parameter threshold used to generate the first resource information; and communicating the first sidelink transmission within the resource allocation for the sidelink channel based at least in part on the first resource information.

Aspect 17: The method of aspect 16, further comprising: receiving, from a second UE, second resource information indicating a second sidelink transmission is scheduled within the resource allocation, that the second resource information has the first priority level, and that the parameter threshold was used to generate the second resource information.

Aspect 18: The method of aspect 17, wherein communicating the first sidelink transmission comprises: transmitting or receiving the first sidelink transmission within a first time and frequency resource of the resource allocation that at least partially overlaps with a second time and frequency resource in which the second sidelink transmission is scheduled based at least in part on the first resource information and the second resource information.

Aspect 19: The method of any of aspects 17 through 18, wherein communicating the first sidelink transmission comprises: transmitting or receiving the first sidelink transmission within a first time and frequency resource of the resource allocation that does not overlap with a second time and frequency resource in which the second sidelink transmission is scheduled based at least in part on the first resource information and the second resource information.

Aspect 20: The method of any of aspects 17 through 19, wherein receiving the second resource information comprises: receiving the second resource information that indicates the parameter threshold that is a reference signal received power threshold.

Aspect 21: The method of any of aspects 17 through 20, wherein communicating the first sidelink transmission comprises: transmitting or receiving the first sidelink transmission within a first time and frequency resource of the resource allocation that at least partially overlaps with a second time and frequency resource in which the second sidelink transmission is scheduled based at least in part on a determination that the first time and frequency resource is available using at least one of the parameter threshold, an adjustment to the parameter threshold, the first priority level of the first resource information, a priority level of the second sidelink transmission, or a combination thereof.

Aspect 22: The method of any of aspects 17 through 21, wherein communicating the first sidelink transmission comprises: transmitting or receiving the first sidelink transmission within a first time and frequency resource of the resource allocation that does not overlap with a second time and frequency resource in which the second sidelink transmission is scheduled based at least in part on a determination that the second time and frequency resource is unavailable using at least one of the parameter threshold, an adjustment to the parameter threshold, the first priority level of the first resource information, a priority level of the second sidelink transmission, or a combination thereof.

Aspect 23: The method of any of aspects 17 through 22, further comprising: transmitting third resource information that indicates the first sidelink transmission is scheduled within a first time and frequency resource of the resource allocation, the second sidelink transmission is scheduled within a second time and frequency resource of the resource allocation, the third resource information has the first priority level, and that the parameter threshold was used to generate the third resource information.

Aspect 24: The method of any of aspects 17 through 23, wherein receiving the second resource information comprises: receiving the second resource information that indicates a time window for the second resource information.

Aspect 25: The method of aspect 24, wherein receiving the second resource information comprises: receiving the second resource information that indicates frequency availability data, frequency occupancy data, or both, for the resource allocation within the time window.

Aspect 26: The method of any of aspects 17 through 25, further comprising: merging the first resource information with the second resource information to generate merged resource information based at least in part on determining that a priority level of the first sidelink transmission matches the first priority level of the first resource information; and selecting a transmission resource within the resource allocation based at least in part on the merged resource information, wherein the first sidelink transmission is communicated within the transmission resource.

Aspect 27: The method of any of aspects 16 through 26, further comprising: receiving control signaling indicating that sharing of resource information is permitted.

Aspect 28: The method of any of aspects 16 through 27, further comprising: receiving control information scheduling a second sidelink transmission within the resource allocation and indicating a priority level of the second sidelink transmission, wherein the first sidelink transmission is communicated within the resource allocation based at least in part on the control information.

Aspect 29: An apparatus for wireless communications by a first UE, comprising a processor; memory coupled with the processor; and instructions stored in the memory and executable by the processor to cause the apparatus to perform a method of any of aspects 1 through 15.

Aspect 30: An apparatus for wireless communications by a first UE, comprising at least one means for performing a method of any of aspects 1 through 15.

Aspect 31: A non-transitory computer-readable medium storing code for wireless communications by a first UE, the code comprising instructions executable by a processor to perform a method of any of aspects 1 through 15.

Aspect 32: An apparatus for wireless communications by a first UE, comprising a processor; memory coupled with the processor; and instructions stored in the memory and executable by the processor to cause the apparatus to perform a method of any of aspects 16 through 28.

Aspect 33: An apparatus for wireless communications by a first UE, comprising at least one means for performing a method of any of aspects 16 through 28.

Aspect 34: A non-transitory computer-readable medium storing code for wireless communications by a first UE, the code comprising instructions executable by a processor to perform a method of any of aspects 16 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first user equipment (UE), comprising:
    receiving, from a second UE, first resource information indicating a first sidelink transmission scheduled within a first time and frequency resource of a resource allocation for a sidelink channel, a first priority level of the first resource information, and a parameter threshold used to generate the first resource information;
    communicating a second sidelink transmission within the resource allocation for the sidelink channel based at least in part on the first resource information; and
    merging the first resource information with second resource information generated by the first UE to obtain merged resource information based at least in part on determining that a priority level of the second sidelink transmission matches the first priority level of the first resource information.

2. The method of claim 1, wherein communicating the second sidelink transmission comprises:
    transmitting or receiving the second sidelink transmission within a second time and frequency resource of the resource allocation that at least partially overlaps with the first time and frequency resource.

3. The method of claim 1, wherein communicating the second sidelink transmission comprises:
    transmitting or receiving the second sidelink transmission within a second time and frequency resource of the resource allocation that does not overlap with the first time and frequency resource.

4. The method of claim 1, wherein receiving the first resource information comprises:
    receiving the first resource information that indicates the parameter threshold that is a reference signal received power threshold.

5. The method of claim 1, wherein communicating the second sidelink transmission comprises:
    transmitting or receiving the second sidelink transmission within a second time and frequency resource of the resource allocation that at least partially overlaps with the first time and frequency resource based at least in part on a determination that the second time and frequency resource is available using at least one of the parameter threshold, an adjustment to the parameter threshold, the first priority level of the first resource information, a second priority level of the second sidelink transmission, or a combination thereof.

6. The method of claim 1, wherein communicating the second sidelink transmission comprises:
    transmitting or receiving the second sidelink transmission within a second time and frequency resource of the resource allocation that does not overlap with the first time and frequency resource based at least in part on a determination that the first time and frequency resource is unavailable using at least one of the parameter threshold, an adjustment to the parameter threshold, the first priority level of the first resource information, a second priority level of the second sidelink transmission, or a combination thereof.

7. The method of claim 1, further comprising:
    selecting a transmission resource within the resource allocation based at least in part on the merged resource information, wherein the second sidelink transmission is communicated within the transmission resource.

8. The method of claim 1, further comprising:
    transmitting second resource information that indicates the first sidelink transmission scheduled within the first time and frequency resource of the resource allocation, the second sidelink transmission scheduled within a second time and frequency resource of the resource allocation, and that the second resource information has the first priority level.

9. The method of claim 1, further comprising:
    receiving second resource information indicating at least one additional transmission scheduled within the resource allocation having a second priority level that differs from the first priority level, wherein the second sidelink transmission is communicated within the resource allocation based at least in part on the first resource information and the second resource information.

10. The method of claim 9, wherein receiving the second resource information comprises:
    receiving the second resource information that indicates a second parameter threshold used to generate the second resource information.

11. The method of claim 1, wherein receiving the first resource information comprises:
    receiving the first resource information that indicates a time window for the first resource information.

12. The method of claim 11, wherein receiving the first resource information comprises:
    receiving the first resource information that indicates frequency availability data, frequency occupancy data, or both, for the resource allocation within the time window.

13. The method of claim 1, further comprising:
receiving control signaling indicating that sharing of resource information is permitted.

14. The method of claim 1, further comprising:
receiving control information scheduling a third sidelink transmission within the resource allocation and indicating a priority level of the third sidelink transmission, wherein the second sidelink transmission is communicated within the resource allocation based at least in part on the control information.

15. The method of claim 1, wherein the first resource information indicates a plurality of sidelink transmissions.

16. A method for wireless communications by a first user equipment (UE), comprising:
transmitting a first resource information indicating a first sidelink transmission is scheduled within a resource allocation for a sidelink channel, a first priority level of the first resource information, and a parameter threshold used to generate the first resource information;
communicating the first sidelink transmission within the resource allocation for the sidelink channel based at least in part on the first resource information; and
merging the first resource information with second resource information from a second UE to obtain merged resource information based at least in part on determining that a priority level of the first sidelink transmission matches the first priority level of the first resource information.

17. The method of claim 16, further comprising:
receiving, from the second UE, the second resource information indicating a second sidelink transmission is scheduled within the resource allocation, that the second resource information has the first priority level, and that the parameter threshold was used to generate the second resource information.

18. The method of claim 17, wherein communicating the first sidelink transmission comprises:
transmitting or receiving the first sidelink transmission within a first time and frequency resource of the resource allocation that at least partially overlaps with a second time and frequency resource in which the second sidelink transmission is scheduled based at least in part on the first resource information and the second resource information.

19. The method of claim 17, wherein communicating the first sidelink transmission comprises:
transmitting or receiving the first sidelink transmission within a first time and frequency resource of the resource allocation that does not overlap with a second time and frequency resource in which the second sidelink transmission is scheduled based at least in part on the first resource information and the second resource information.

20. The method of claim 17, wherein receiving the second resource information comprises:
receiving the second resource information that indicates the parameter threshold that is a reference signal received power threshold.

21. The method of claim 17, wherein communicating the first sidelink transmission comprises:
transmitting or receiving the first sidelink transmission within a first time and frequency resource of the resource allocation that at least partially overlaps with a second time and frequency resource in which the second sidelink transmission is scheduled based at least in part on a determination that the first time and frequency resource is available using at least one of the parameter threshold, an adjustment to the parameter threshold, the first priority level of the first resource information, a priority level of the second sidelink transmission, or a combination thereof.

22. The method of claim 17, wherein communicating the first sidelink transmission comprises:
transmitting or receiving the first sidelink transmission within a first time and frequency resource of the resource allocation that does not overlap with a second time and frequency resource in which the second sidelink transmission is scheduled based at least in part on a determination that the second time and frequency resource is unavailable using at least one of the parameter threshold, an adjustment to the parameter threshold, the first priority level of the first resource information, a priority level of the second sidelink transmission, or a combination thereof.

23. The method of claim 17, further comprising:
transmitting third resource information that indicates the first sidelink transmission is scheduled within a first time and frequency resource of the resource allocation, the second sidelink transmission is scheduled within a second time and frequency resource of the resource allocation, the third resource information has the first priority level, and that the parameter threshold was used to generate the third resource information.

24. The method of claim 17, wherein receiving the second resource information comprises:
receiving the second resource information that indicates a time window for the second resource information.

25. The method of claim 24, wherein receiving the second resource information comprises:
receiving the second resource information that indicates frequency availability data, frequency occupancy data, or both, for the resource allocation within the time window.

26. The method of claim 16, further comprising:
selecting a transmission resource within the resource allocation based at least in part on the merged resource information, wherein the first sidelink transmission is communicated within the transmission resource.

27. The method of claim 16, further comprising:
receiving control signaling indicating that sharing of resource information is permitted.

28. The method of claim 16, further comprising:
receiving control information scheduling a second sidelink transmission within the resource allocation and indicating a priority level of the second sidelink transmission, wherein the first sidelink transmission is communicated within the resource allocation based at least in part on the control information.

29. An apparatus for wireless communications by a first user equipment (UE), comprising:
a transceiver,
a processor, memory coupled with the processor; and
instructions stored in the memory and executable by the processor to cause the apparatus to:
receive, from a second UE, a first resource information indicating a first sidelink transmission scheduled within a first time and frequency resource of a resource allocation for a sidelink channel, a first priority level of the first resource information, and a parameter threshold used to generate the first resource information;
communicate, via the transceiver, a second sidelink transmission within the resource allocation for the sidelink channel based at least in part on the first resource information; and merge the first resource information with second resource information generated by the first UE to obtain merged resource information based at least in part on determining that a priority level of the second sidelink transmission matches the first priority level of the first resource information.

30. An apparatus for wireless communications by a first user equipment (UE), comprising:
a transceiver,
a processor,
memory coupled with the processor; and
instructions stored in the memory and executable by the processor to cause the apparatus to:
transmit first resource information indicating a first sidelink transmission is scheduled within a resource allocation for a sidelink channel, a first priority level of the first resource information, and a parameter threshold used to generate the first resource information;
communicate, via the transceiver, the first sidelink transmission within the resource allocation for the sidelink channel based at least in part on the first resource information; and
merge the first resource information with second resource information from a second UE to obtain merged resource information based at least in part on determining that a priority level of the first sidelink transmission matches the first priority level of the first resource information.

* * * * *